United States Patent
Ono

(10) Patent No.: US 7,656,399 B2
(45) Date of Patent: Feb. 2, 2010

(54) DISPLAYING APPARATUS, A DISPLAYING METHOD, AND A MACHINE READABLE MEDIUM STORING THEREON A COMPUTER PROGRAM

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 725 days.

(21) Appl. No.: 11/216,151

(22) Filed: Sep. 1, 2005

(65) Prior Publication Data

US 2006/0050086 A1    Mar. 9, 2006

(30) Foreign Application Priority Data

Sep. 3, 2004    (JP) .............................. 2004-257474

(51) Int. Cl.
G09G 5/00    (2006.01)
G06F 3/038    (2006.01)

(52) U.S. Cl. ...................... 345/204; 715/730; 345/620; 345/629

(58) Field of Classification Search .................. 345/87, 345/204, 76, 156, 168, 169, 620, 629; 715/730–732
See application file for complete search history.

(56) References Cited

U.S. PATENT DOCUMENTS 6,988,244 B1 *   1/2006  Honda et al. ................. 715/721

2002/0054157 A1 *   5/2002  Hayashi et al. ............. 345/838
2003/0169286 A1 *   9/2003  Misawa ....................... 345/716

FOREIGN PATENT DOCUMENTS

JP    2000020532 A  *   1/2000
JP    2004-90632 A      3/2004

\* cited by examiner

*Primary Examiner*—Amr Awad
*Assistant Examiner*—Stephen G Sherman
(74) *Attorney, Agent, or Firm*—Birch, Stewart, Kolasch & Birch, LLP

(57) ABSTRACT

It is an object to provide a displaying apparatus for displaying a plurality of images quickly in a short time while guaranteeing high visibility. A displaying apparatus for sequentially updating and displaying a plurality of images includes: an image getting unit for getting a plurality of images which should be displayed in case of getting an instruction of updating and displaying the plurality of images at high speed; a cutting unit for cutting out a partial region of each of the plurality of image gotten by the image getting unit as a partial image; an image compositing unit for generating a first composite image by arranging a plurality of partial images of the number which can be displayed at one time out of the plurality of partial images cut out by the cutting unit and compositing the plurality of partial images and generating a second composite image by deleting one partial image of the plurality of partial images included in the first composite image and adding a second partial image which is not included in the first composite image; and a displaying unit for sequentially updating the composite image at a designated update speed to display the composite image.

22 Claims, 20 Drawing Sheets

DISPLAYING APPARATUS, A DISPLAYING METHOD, AND A MACHINE READABLE MEDIUM STORING THEREON A COMPUTER PROGRAM

CROSS REFERENCE TO RELATED APPLICATION

The present application claims priority from Japanese Patent Applications Nos. JP 2004-257474 filed on Sep. 3, 2004 and 2005-223420 filed on Aug. 1, 2005, the contents of which are incorporated herein by reference.

BACKGROUND OF THE INVENTION

1. Field of the Invention

The present invention relates to a displaying apparatus, a displaying method, and a machine readable medium storing thereon a computer program. More particularly, the present invention relates to a displaying apparatus, a displaying method, and a machine readable medium storing thereon a computer program which guarantees visibility and display a plurality of images quickly in a short time.

2. Description of the Related Art

Conventionally, in order to display a large number of digital images by using a displaying apparatus, the images are scrolled or switched one by one like a slideshow, or a plurality of thumb-nail images generated by reducing image data of the digital image are displayed on a display according to an operation by a user as disclosed, for example, in Japanese Patent Application Laid-Open No. 2004-90632.

SUMMARY OF THE INVENTION

However, since the number of images which the user can view at once is small in case the images are scrolled or switched one by one, there is a problem that it is difficult to display a large number of images in a short time. Further, since each of thumb-nail images is displayed with its characteristic part reduced, there is a problem that it is difficult to distinguish a plurality of thumb-nail images which are different in composition.

Therefore, it is an object of the present invention to provide a displaying apparatus, a displaying method, and a machine readable medium storing thereon a computer program, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, a displaying apparatus for sequentially updating and displaying a plurality of images includes: an image getting unit for getting a plurality of images which should be displayed in case of getting an instruction of updating and displaying the plurality of images at high speed; a cutting unit for cutting out a partial region of each of the plurality of image gotten by the image getting unit as a partial image; an image compositing unit for generating a first composite image by arranging a plurality of partial images of the number which can be displayed at one time out of the plurality of partial images cut out by the cutting unit and compositing the plurality of partial images and generating a second composite image by deleting one partial image of the plurality of partial images included in the first composite image and adding a second partial image which is not included in the first composite image; and a displaying unit for sequentially updating the composite image at a designated update speed to display the composite image.

Further, each of the plurality of images gotten by the image getting unit may include information specifying the position of a main object, and the cutting unit may cut out a partial image so that the partial image includes the main object. In case one image obtained by the image getting unit includes information specifying the position of a plurality of main objects, the cutting unit may cut the image into a plurality of partial images so that the plurality of partial images includes the plurality of main objects, respectively, and the image compositing unit may generate a composite image by arranging the plurality of partial images cut out from the one image by the cutting unit and compositing the plurality of partial images. Further, in case the designated update speed is higher than a predetermined threshold value, the cutting unit may reduce the size of the partial image and the image compositing unit may increase the number of partial images included in the composite image.

Further, in case the designated update speed is higher than a predetermined threshold value, the image compositing unit may select out a plurality of partial images to generate the composite image. Further, the displaying unit may increase at least one of brightness and contrast of display in case of updating and displaying images at high speed. The displaying apparatus further includes a continuous-shot image selecting unit for selecting a plurality of images captured by continuous-shot of the plurality of images gotten by the image getting unit, and the image compositing unit may generate a plurality of composite images so that a plurality of partial images each of which is cut out from each of the plurality of images selected by the continuous-shot image selecting unit are displayed at the same positions of the plurality of composite images continuously and in time-series.

Further, the image compositing unit may generate a first composite image including a partial image cut out from a first image selected by the continuous-shot image selecting unit and generates a second composite image by deleting a partial image included in the first image selected by the continuous-shot image selecting unit adding a partial image included in a second image selected by the continuous-shot image selecting unit, and the displaying unit may update and display the partial images cut out from the plurality of images selected by the continuous-shot image selecting unit at display speed lower than that of partial images cut out from a plurality of images which are not selected by the continuous-shot image selecting unit. The displaying apparatus further includes an update speed determining unit for determining update speed at which the partial images are updated according to the contents of the plurality of partial images cut out by the cutting unit, the image compositing unit may determine a partial image to be deleted from the first composite image based on the update speed of each partial image determined by the update speed determining unit and generates a second composite image by adding a second partial image, and the displaying unit may update and display each of the partial images at the update speed of the partial image determined by the update speed determining unit.

The displaying apparatus further includes a frequency component acquiring unit for acquiring frequency components included in each of the plurality of images cut by the cutting unit, and the update speed determining unit may determine update speed of a partial image to be lower as the level of frequency component of the partial image acquired by the frequency component acquiring unit which is higher than a predetermined frequency is higher. Further, the number of objects acquiring unit may acquire the number of persons included in each of the plurality of partial images cut out by the cutting unit, and the update speed determining unit may determine update speed of a partial image to be lower as the number of persons acquired by the number of objects acquiring unit is larger.

The displaying apparatus further includes a number of objects acquiring unit for acquiring the number of persons included in each of the plurality of partial images cut out by the cutting unit and a displaying order determining unit for determining the displaying order according to the number of objects acquired by the number of objects acquiring unit, and the image compositing unit may generate a plurality of composite images sequentially by selecting partial images sequentially according to the displaying order determined by the displaying order determining unit. Further, each of the plurality of images gotten by the image getting unit may include information specifying the direction of the image, the cutting unit may cut out a laterally long partial image from an image directed laterally and a longitudinally long partial image from an image directed longitudinally, and the image compositing unit generate a composite image by collecting and compositing the laterally long partial images and a composite image by collecting and compositing the longitudinally long partial images.

According to the second aspect of the present invention, a displaying method for sequentially updating and displaying a plurality of images by a displaying apparatus includes steps of: getting a plurality of images which should be displayed in case of getting an instruction of updating and displaying the plurality of images at high speed; cutting out a partial region of each of the gotten plurality of image as a partial image; generating a composite image by arranging a plurality of partial images of the number which can be displayed at one time and compositing the plurality of partial images; generating a first composite image by arranging a plurality of partial images of the number which can be displayed at one time out of the plurality of partial images cut out by the cutting unit and compositing the plurality of partial images and generating a second composite image by deleting one partial image of the plurality of partial images included in the first composite image and adding a second partial image which is not included in the first composite image; and sequentially updating the composite image at a designated update speed to display the composite image.

According to the third aspect of the present invention, a machine readable medium storing thereon a computer program for a displaying apparatus for sequentially updating and displaying a plurality of images, the program making the displaying apparatus perform: an image getting function of getting a plurality of images which should be displayed in case of getting an instruction of updating a plurality of images at high speed; a cutting function of cutting out a part of each of the plurality of image gotten by an image getting unit as a partial image; an image compositing function of generating a first composite image by arranging a plurality of partial images of the number which can be displayed at one time out of the plurality of partial images cut out by a cutting unit and compositing the plurality of partial images and generating a second composite image by deleting one partial image of the plurality of partial images included in the first composite image and adding a second partial image which is not included in the first composite image; and a displaying function of sequentially updating the composite image at a designated update speed to display the composite image.

According to the fourth aspect of the present invention, a displaying apparatus for sequentially updating and displaying a plurality of images includes: an image getting unit for getting still picture(s) and moving picture(s) which should be displayed in case of getting an instruction of updating and displaying the still picture(s) and the moving picture(s) at high speed; a displaying unit for arranging and displaying each of still pictures and moving pictures of the number which can be displayed at one time out of the still picture(s) and the moving picture(s) gotten by the image getting unit; a display controlling unit for making a still picture or a moving picture which has not been displayed on the displaying unit out of the still picture(s) and the moving picture(s) gotten by the image getting unit displayed on the displaying unit instead of one of the still picture(s) and the moving pictures which are being displayed on the displaying unit; and an update controlling unit for updating and displaying sequentially the still picture(s) and the moving picture(s) displayed by the displaying unit at an update speed designated by a user.

The displaying apparatus further includes a partial period moving picture extracting unit for extracting a partial period moving picture which is a part of the moving picture during a characteristic partial period, the displaying unit may arrange and display the still picture gotten by the image getting unit and the partial period moving picture extracted by the partial period moving picture extracting unit, and the update controlling unit sequentially may update and display the still picture (s) displayed by the displaying unit at the update speed designated by the user while the partial period moving picture extracted by the partial period moving picture extracting unit is displayed. The displaying apparatus further includes a main object specifying unit for specifying a main object of the moving picture gotten by the image getting unit, and the partial period moving picture extracting unit may extract a partial period moving picture including a part where an image of the main object specified by the main object specifying unit is captured the partial period moving picture extracting unit may extract a partial period moving picture including a part where volume of voice accompanying the moving picture is larger than a predetermine value out of the moving picture gotten by the image getting unit Further, the update controlling unit may update and display the still picture displayed by the displaying unit sequentially at the update speed designated by the user. The displaying apparatus further includes a still picture cutting unit for cutting out a partial region of the still picture gotten by the image getting unit as a partial still picture, and a partial moving picture generating unit for generating a partial moving picture by cutting out a partial region of each of a plurality of images constituting the moving picture gotten by the image getting unit, and the displaying unit may arrange and display each of the still picture cut out by the still picture cutting unit and the partial moving picture generated by the partial moving picture generating unit.

The displaying apparatus further includes a main object specifying unit for specifying a main object of the moving picture gotten by the image getting unit, and the partial moving picture generating unit may cut out a partial region of each of the plurality of images constituting the moving picture gotten by the image getting unit so that the partial region includes the main object specified by the main object specifying unit and generates a partial moving picture tracking the main object specified by the main object specifying unit. The displaying apparatus further includes a plurality of voice outputting units which, in case the displaying unit displays a plurality of moving pictures at the same time, outputting voice accompanying each of the plurality of moving pictures from the direction corresponding the position where the moving picture is displayed.

According to the fifth aspect of the present invention, a displaying method for sequentially updating and displaying a plurality of images includes steps of: getting still picture(s) and moving picture(s) which should be displayed in case of getting an instruction of updating and displaying the still picture(s) and the moving picture(s) at high speed; arranging and displaying each of still pictures and moving pictures of the number which can be displayed at one time out of the still picture(s) and the moving picture(s) gotten; making a still picture or a moving picture which has not been displayed out of the still picture(s) and the gotten moving picture(s) displayed instead of one of the still picture(s) and the moving pictures which are being displayed; and updating and displaying sequentially the still picture(s) and the moving picture(s) displayed at an update speed designated by a user.

According to the sixth aspect of the present invention, a machine readable medium storing thereon a computer program for a displaying apparatus for sequentially updating and displaying a plurality of images, the program making the displaying apparatus perform; an image getting function of getting still picture(s) and moving picture(s) which should be displayed in case of getting an instruction of updating and displaying the still picture(s) and the moving picture(s) at high speed; a displaying function of arranging and displaying each of still pictures and moving pictures of the number which can be displayed at one time out of the still picture(s) and the moving picture(s) gotten by an image getting unit; a display controlling function of making a still picture or a moving picture which has not been displayed on a displaying unit out of the still picture(s) and the moving picture(s) gotten by the image getting unit displayed on the displaying unit instead of one of the still picture(s) and the moving pictures which are being displayed on the displaying unit; and an update controlling function of updating and displaying sequentially the still picture(s) and the moving picture(s) displayed by the displaying unit at an update speed designated by a user.

The summary of the invention does not necessarily describe all necessary features of the present invention. The present invention may also be a sub-combination of the features described above.

According to the present invention, it is possible to provide a displaying apparatus which displays a large number of images quickly in a short time while guaranteeing high visibility and a user can quickly find out an image which he or she wants out of the large number of images.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
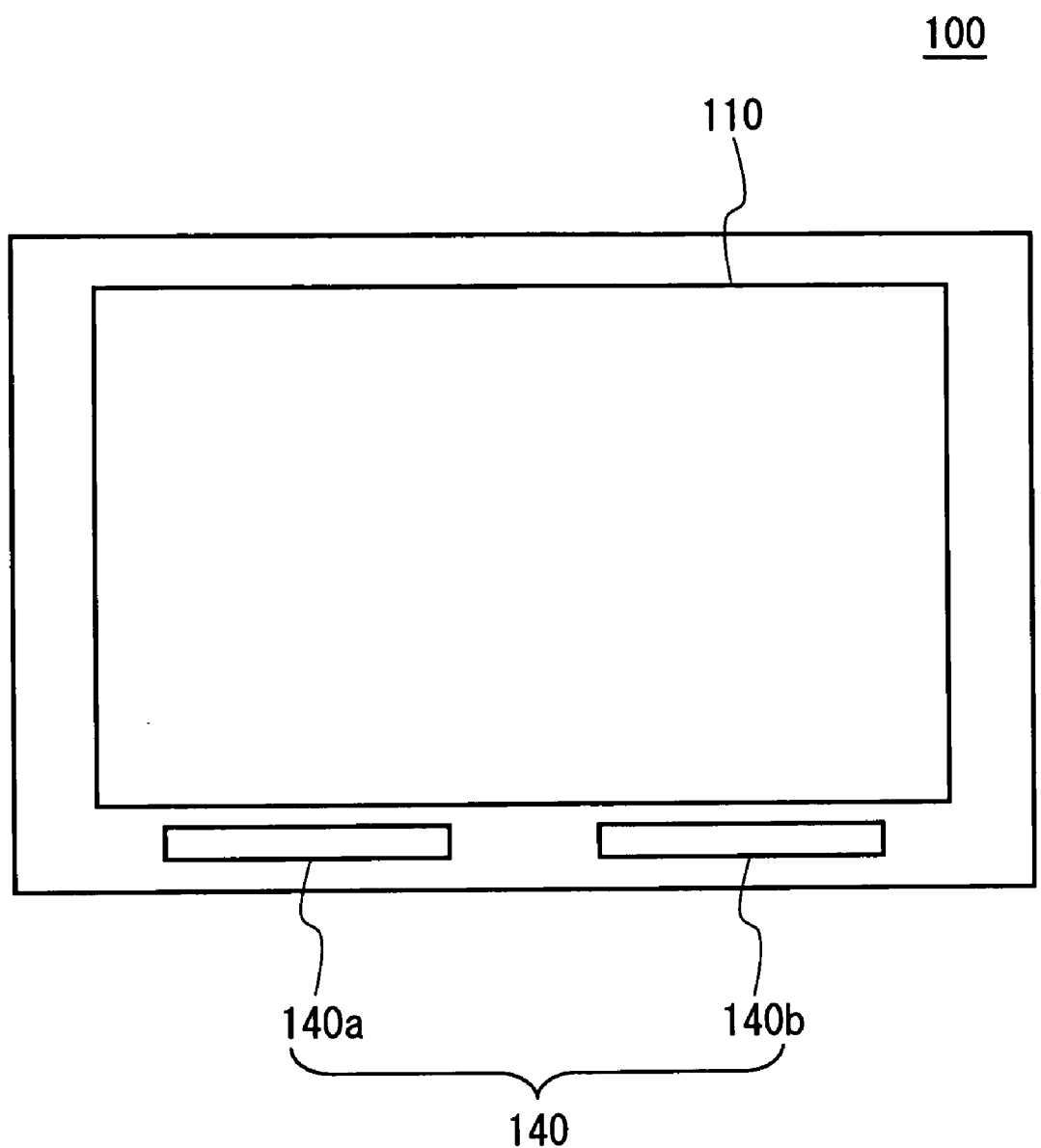
FIG. 1 shows a portable displaying apparatus 100 which is an embodiment of a displaying apparatus.

FIG. 1 shows a portable displaying apparatus 100 which is a first embodiment of a displaying apparatus. The displaying apparatus 100 includes a displaying unit 110 and instruction getting units 140a and 140b (hereinafter, referred to "instruction getting unit 140") on a surface of its case of slim rectangular parallelepiped shape. The displaying apparatus 100 sequentially updates and displays a plurality of images when a user searches for a specific image from the plurality of images. The displaying apparatus 100 judges which one of the instruction getting units 140a and 140b the user contacts with. Then, on the basis of the judgment, it is determined whether the order of displaying images is to be forward or reverse. Therefore, the user can update the images in one of the forward direction or the reverse direction.

Further, each of the instruction getting units 140a and 140b has a contact part on its surface such as an electrostatic pad. The shape of the contact part is long in one direction, for example. The user inputs update speed according to a position in the instruction getting units 140a and 140b with which the user contacts. When the user contacts with the contact part, the displaying apparatus 100 detects the position in the contact part with which the user contacts. Then, on the basis of the detected contact position, the update speed is judged. Further, the displaying apparatus 100 may judge the speed of updating images on the basis of a moving speed of the contact position or an acceleration of the moving. Further, the image may be a still picture or a moving picture. Further, the moving picture may be composed of a plurality of images and the plurality of images included in the moving picture may include one of frame images, field images, and images of various types constituting different moving pictures.

It is an object of the displaying apparatus 100 according to the present embodiment to display a large number of images quickly in a short time while guaranteeing high visibility and make the user quickly find out an image which he or she wants out of the large number of images.

Figure 2:
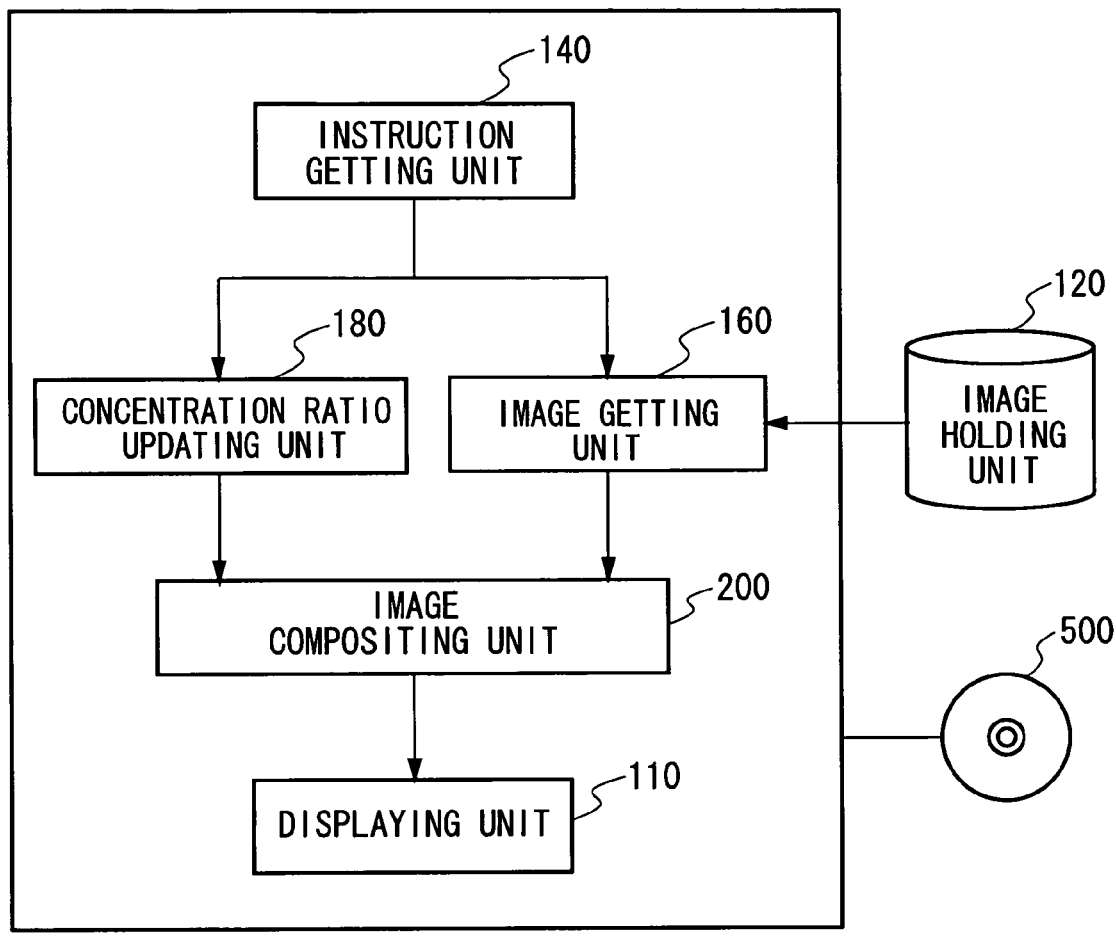
FIG. 2 is a block diagram showing a first embodiment of functional configuration of the displaying apparatus 100.

FIG. 2 shows a first embodiment of functional configuration of the displaying apparatus 100. When a person leafs through of a book having a plurality of pages, he or she sees one and the next pages, which overlap each other, due to an afterimage phenomenon. However, if the person blinks his or her eyes in the moment a page is shown, the page is not reflected in the eyes. Further, an afterimage also does not remain. Therefore, the person cannot perceive the page shown in the moment the person blinks his or her eyes.

Thus, it is required to make the user be able to perceive the page shown in the moment the user blinks his or her eyes. In order to achieve the object, the displaying apparatus 100 displays a first image and a second image which should be displayed next to the first image so that the first and second images overlap each other. Further, the displaying apparatus 100 updates display of the images while lowering a concentration ratio of the first image to the second image.

The displaying apparatus 100 includes an image holding unit 120, an image getting unit 160, a concentration ratio updating unit 180, and an image compositing unit 200, in addition to the displaying unit 110 and the instruction getting unit 140. The image holding unit 120 previously holds a group of images including a plurality of images. The group of images is, for example, an electronic book or an electronic album. In this case, the image is a page of the electronic book or an electronic photograph. Further, in case of including string data, the image includes string size information showing the size of a string to be displayed. Further, the group of images may be a plurality of images constituting a moving picture. In a case related with this, the images may be frame images, field images, or images of various types constituting different moving pictures. The image getting unit 160 retrieves the group of images from the image holding unit 120.

The concentration ratio updating unit 180 updates a concentration ratio of a first image to a second image for a composite image do that the ratio becomes lower as time goes by. The image compositing unit 200 generates a composite image by compositing the first and the second images on the basis of the concentration ratio acquired by the concentration ratio updating unit 180. Then, the image displaying unit 110 displays the composite image. Thus, the image displaying apparatus 100 displays one image which overlaps with the next image for a while. Therefore, the user can perceive all the pages even if the user blinks his or her eyes.

A recording medium 500 stores thereon a program for having the displaying apparatus 100 function as the instruction getting unit 140, the image holding unit 120, the image getting unit 160, the concentration ratio updating unit 180, the image compositing unit 200, and the displaying unit 110 as described above. The recording medium 500 may be connected to the displaying apparatus 100 via a network such as the internet. The displaying apparatus 100 may install this kind of program via the network and execute it.

Figure 3:
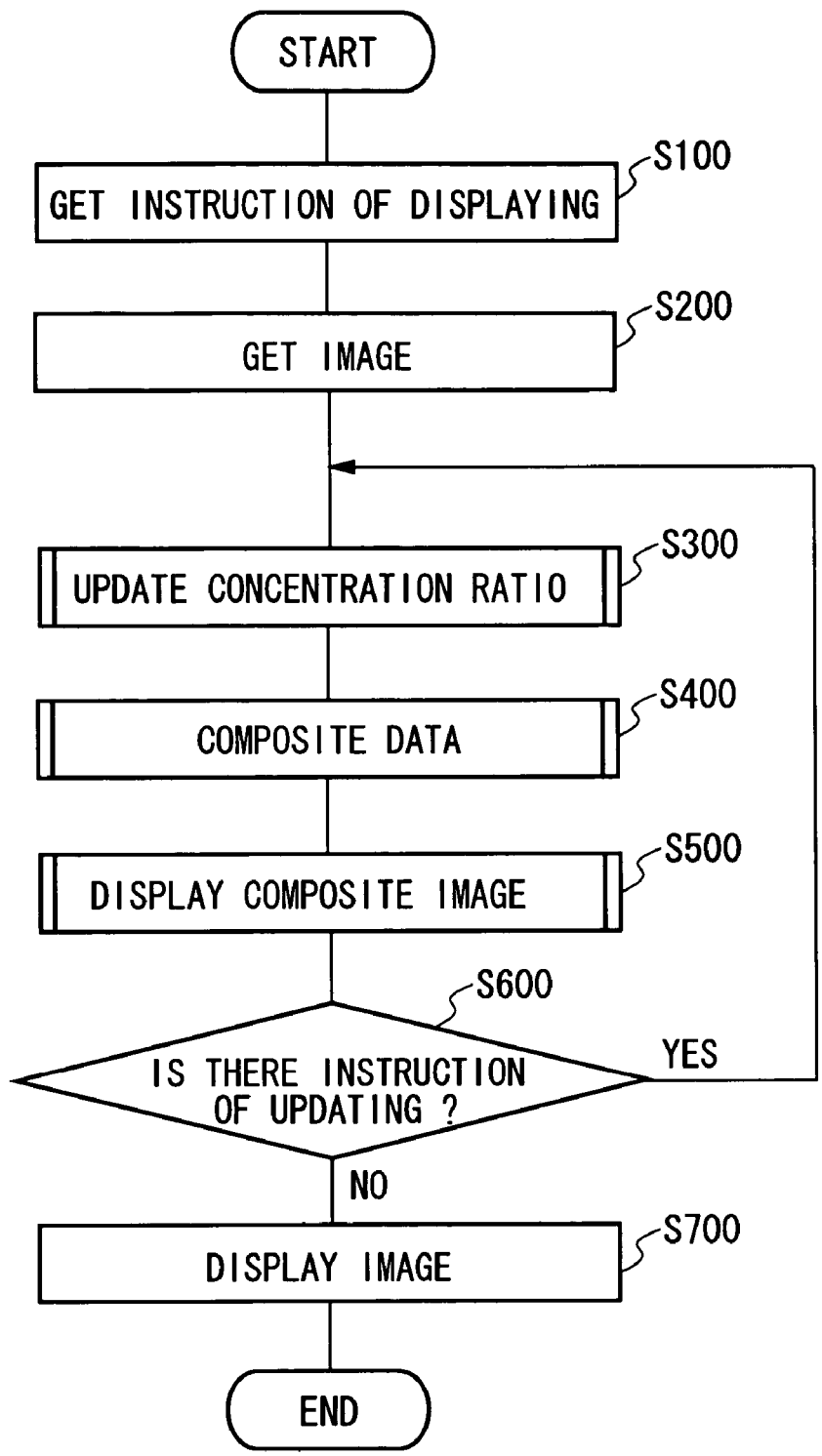
FIG. 3 is a flow chart showing operations of the displaying apparatus 100 shown in FIG. 2.

FIG. 3 is a flow chart showing operations of the displaying apparatus 100 shown in FIG. 2. The user contacts with the instruction getting unit 140 in order to make the displaying apparatus 100 update and display the group of images. At this time, the instruction getting unit 140 judges that an instruction of displaying images constituting the group of images sequentially is input (S100). The image getting unit 160 gets the group of images from the image holding unit 120 (S200). Further, the concentration ratio updating unit 180 acquires a concentration ratio (S300). The image compositing unit 200 generates a composite image by compositing one image and the next image according to the acquired concentration ratio (S400). The displaying unit 110 displays the generated composite image (S500).

The displaying apparatus 100 repeats the operations of S300 to S500 until there is no input for updating images and displays the plurality of images sequentially (S600). Then, an image displayed when there has been no input for updating images is displayed at it has been (S700).

As above, the displaying apparatus 100 displays one image which overlaps with the next image for a while. Therefore, the user can perceive all the pages even if the user blinks his or her eyes.

Further, a period of repeating S300 to S500, that is, an interval of updating images, is preferably less than 0.1 second.

Figure 4:
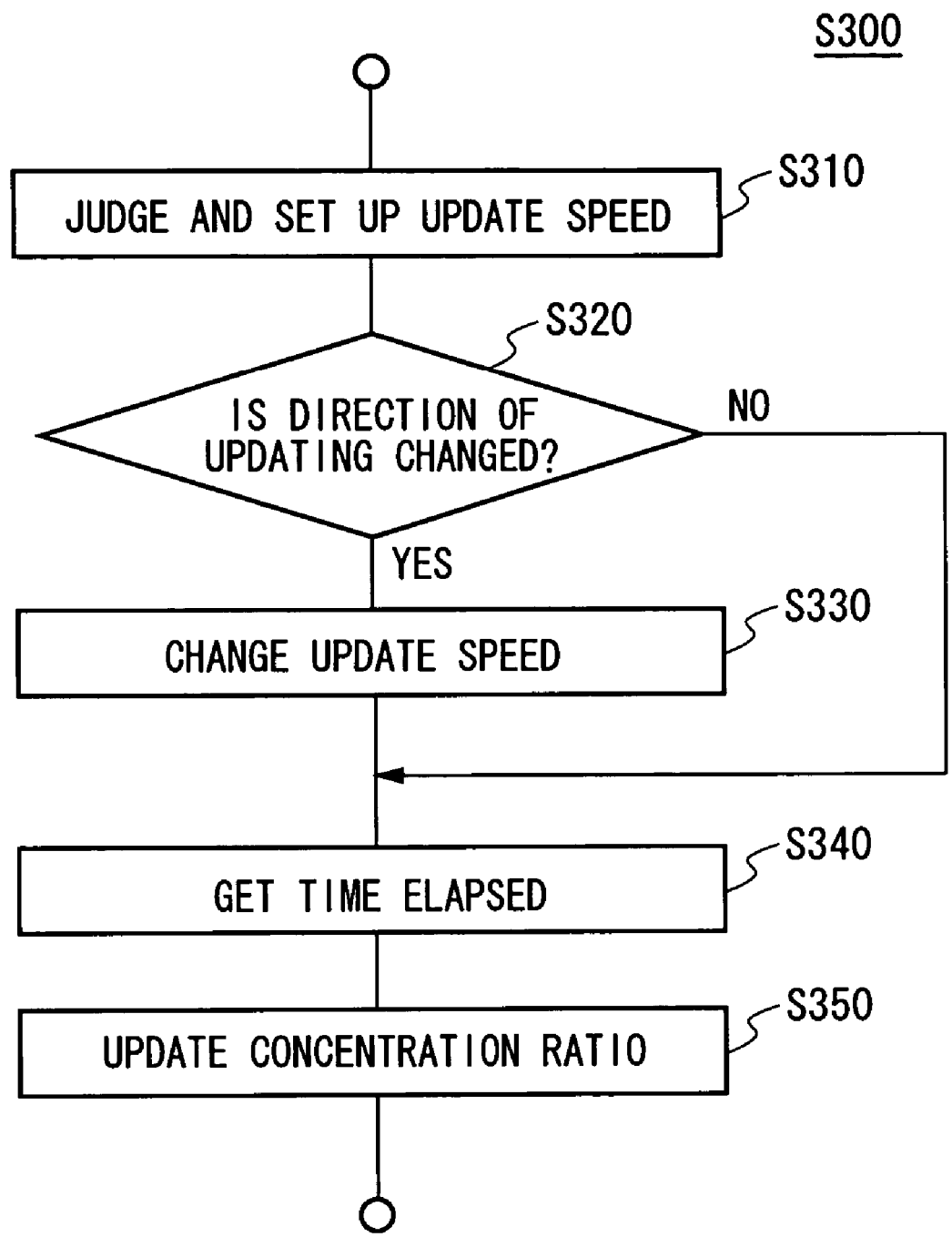
FIG. 4 is a flowchart showing S300 described in FIG. 3 in detail.

FIG. 4 is a flowchart showing S300 described in FIG. 3, that is, operations of the concentration ratio updating unit 180 in detail. There is high possibility for an image of which contents the user wants to check out to be being displayed just before the user changes the direction of updating images just before. Here, the concentration ratio updating unit 180 lowers the speed of updating images when the direction of updating images is changed.

In other words, the concentration ratio updating unit 180 judges which one of the instruction getting units 140a and 140b the user contacts with. Then, on the basis of the judgment, the direction of displaying images is judged. Further, the speed of updating images is judged and set up on the basis of the position in the contact part of the instruction getting unit 140 with which the user contacts (S310).

Further, in case an instruction of changing the direction of updating images is input to the instruction getting unit 140 (S320), the concentration ratio updating unit 180 makes the speed of updating images lower (S330).

Here, a method for changing the speed of updating images by the concentration ratio updating unit 180 is explained.

If the concentration ratio updating unit 180 increases change of the concentration ratio with respect to time which has elapsed from beginning of displaying the next image, time taken for the concentration ratio to be zero (0) is decreased. In a case related with this, the speed of updating images becomes higher. Contrarily, if concentration ratio updating unit 180 decreases the change of the concentration ratio, the time taken for the concentration ratio to be zero (0) is increased. In a case related with this, the speed of updating images becomes lower.

Therefore, the concentration ratio updating unit 180 can change the speed of updating images by varying the change of the concentration ratio with respect to the time which has elapsed from the beginning of displaying the next image.

Then, the concentration ratio updating unit 180 acquires the time which has elapsed from the beginning of displaying the next image (S340). Then, the time which has elapsed from the beginning of the next image and the speed of updating images are used to update the concentration ratio (S350). Thus, the concentration ratio updating unit 180 makes the speed of updating image lower when the instruction of the direction of updating images is switched. Therefore, the user can easily find out an image of which contents he or she wants to check out.

Figure 5:
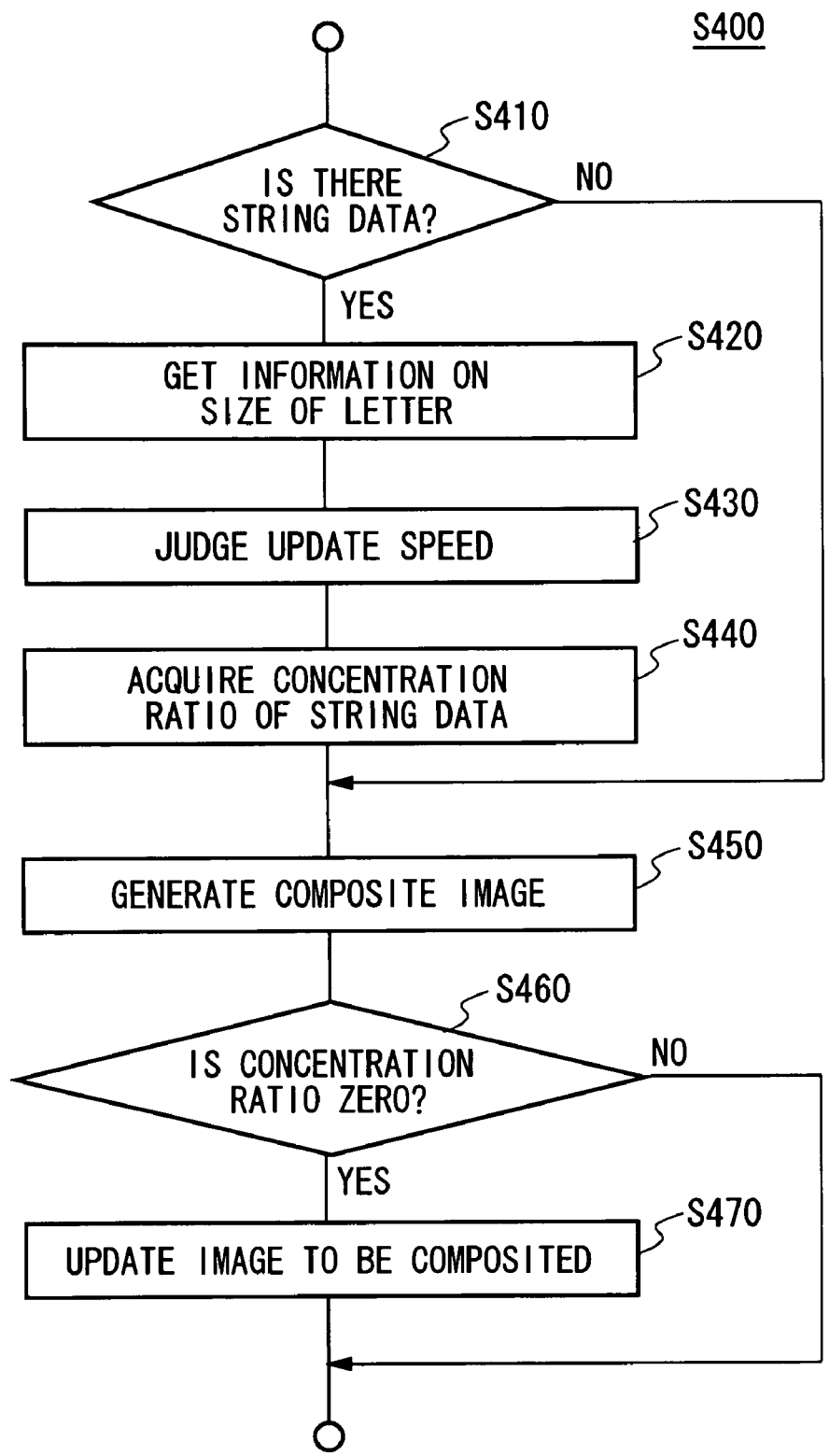
FIG. 5 is a flowchart showing S400 described in FIG. 3 in detail.

FIG. 5 is a flowchart showing S400 described in FIG. 3, that is, operations of the image compositing unit 200 in detail. The size of letters of information showing attribute of information such as a caption and a title of a book, etc. is larger in comparison with other string data. In case of leafing through a book fast, a person lays emphasis on such things like the title to search for a page which is a target. Here, the image compositing unit 200 operates as follows in order to make such things like the title easily recognizable. In other words, in case at least one of an image and the next image includes string data (S410), information on the size of letters of the string data is acquired (S420).

Then, on the basis of the position in the contact part of the instruction getting unit 140 with which the user contacts (S430), the speed of updating images is judged (S430). Then, on the basis of the information on the size of letters and the update speed, the concentration ratio of the string data in the composite image (S440). In other words, the image compositing unit 200 makes a relatively larger letter thicker in comparison with other letters which are relatively smaller. Further, the image compositing unit 200 may not display a letter of which size is smaller than a reference value.

Then, the image compositing unit 200 generates a composite image by compositing a first image and a second image which is an image next to the first image on the basis of the concentration ratio of the first image to the second image and the concentration ratio of letters (S450). Then, in case the concentration ratio of the first image to the second image is zero (0) (S460), the image compositing unit 200 sets the second image to a new first image and an image next to the second image to a new second image (S470).

As above, the image compositing unit 200 makes a relatively larger letter thicker in comparison with a relatively smaller letter. Therefore, the user can check out a title and the like in priority. Further, in S470, the image compositing unit 200 can vary an interval of updating images by varying period from the time when the concentration ratio of the first image to the second image becomes zero (0) to the time when the first and second images are updated.

Figure 6:
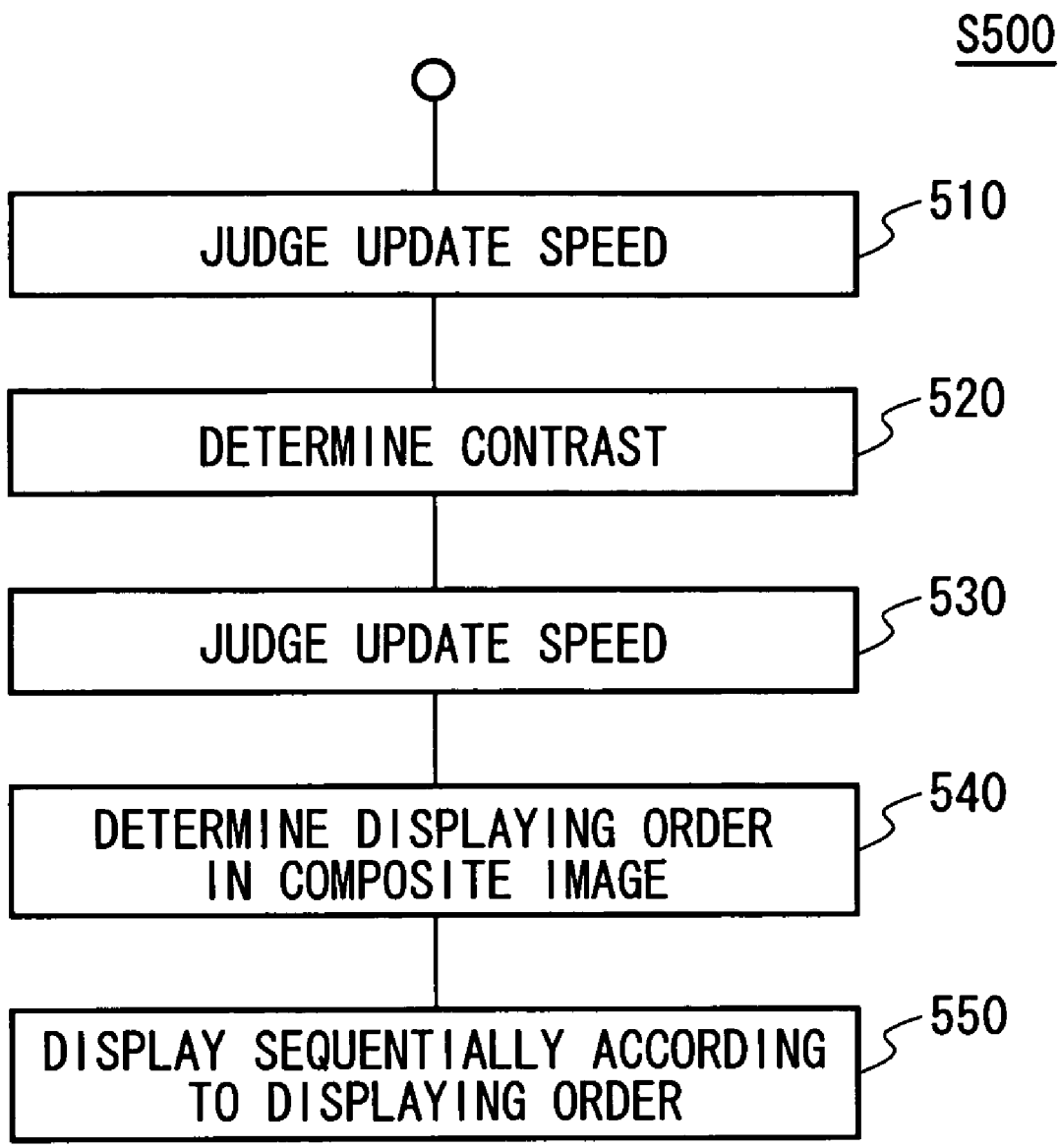
FIG. 6 is a flowchart showing S500 described in FIG. 3 in detail.

FIG. 6 is a flowchart showing S500 described in FIG. 3, that is, operations of the displaying unit 110 in detail. In case of leafing through such a thing like a book, a part in a page first shown is different according to the direction of leafing through. Here, the displaying unit 110 operates as follows.

The displaying unit 110 judges the speed of updating images on the basis of the position in the contact part of the instruction getting unit 140 with which the user contacts (S510). Then, on the basis of the judged update speed, contrast when a composite image is displayed is determined (S520). The displaying unit 110 makes contrast larger when the update speed is higher in comparison with when the update speed is relatively low. Thus, even in case the update speed is high, the user can easily perceive an image displayed on the displaying unit 110.

Then, if the direction of updating images input to the instruction getting unit 140 by the user is judged (S530), the displaying unit 110 determines displaying order in the composite image on the basis of the judgment on the update speed (S540). The displaying unit 110 reverses a displaying order when the update direction is the front direction with respect to a displaying order when the update direction is the reverse direction. For example, in case a group of images is assumed to be a right-binding book, the displaying unit 110 displays composite images orderly from the left when the update direction is the front direction. Further, in case the update direction is the reverse direction, the displaying unit 110 displays composite images orderly from the right. Then, the composite images are displayed according to the determined contrast and the displaying order (S550). Therefore, when the user checks out images by using the displaying apparatus 100, the user can perceive the direction of updating images, that is, the direction of leafing through a book.

Figure 7:
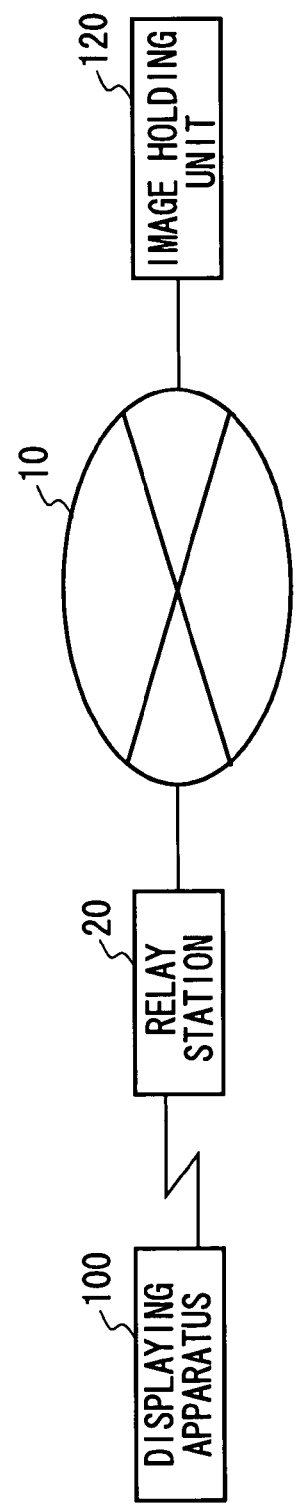
FIG. 7 shows a constitution of the displaying apparatus 100 getting images via a network.

FIG. 7 shows a constitution of the displaying apparatus 100 getting images via a network. The displaying apparatus 100 according to the present embodiment is provided with a function for a wireless communication and connected with a communication network 10 via a relay station 20. Then, the displaying apparatus 100 receives a group of images wirelessly from the image holding unit 120 provided outside via the communication network 10 and the relay station 20 and displays the group of images. According to the displaying apparatus 100 of the present embodiment, one image is displayed for a while so that the image overlaps with the next image when displaying the group of images received from the outside. Therefore, the user can check out all the pages even if the user blinks his or her eyes.

Figure 8:
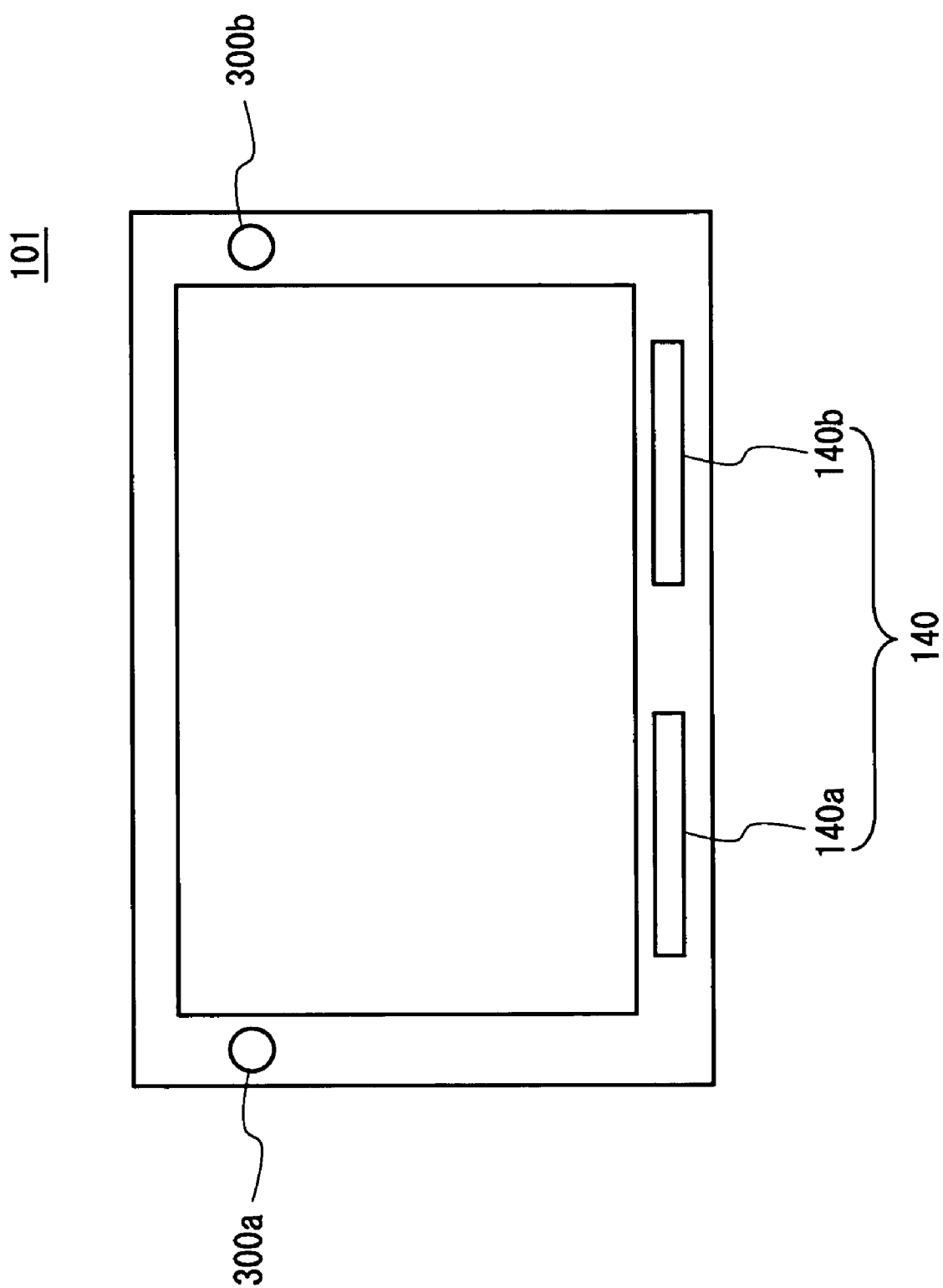
FIG. 8 shows a displaying apparatus 101 which is another embodiment of the displaying apparatus 100.

FIG. 8 shows a displaying apparatus 101 which is another embodiment of the displaying apparatus 100 of the present invention. A displaying unit 110 of the displaying apparatus 101 varies concentration distribution of a composite image on the basis of the direction of the user's sight. More specifically, only a part of the composite image which the user views is displayed, for example. In this case, computational load imposed on the displaying apparatus 101 when the composite image is displayed is reduced.

Further, the displaying apparatus 101 includes image capturing apparatus 300a and 300b on its surface in order to detect the direction of the user's sight Further, the displaying apparatus 101 includes a sight detecting unit for analyzing image data captured by the image capturing apparatus 300a and 300b to detect the direction of the user's sight. Since other functions are the same as those of the displaying apparatus 100, explanation is omitted.

The image capturing apparatus 300a and 300b capture images of the user seeing the displaying apparatus 100 periodically and simultaneously to generate image data. The sight detecting unit analyzes the image data generated by the image capturing apparatus 300a and 300b and acquires the user's sight. More specifically, the direction of the user's face included in the image data is acquired. Further, the position of the user's eyes is acquired. Then, the user's sight is acquired on the basis of the position of the eyes and the direction of the face.

Further, the displaying unit 110 of the displaying apparatus 101 may display a region which the user views so that the region is thicker than other region. Further, the region which the user views may be displayed in detail and details of other region may not be displayed.

Figure 9:
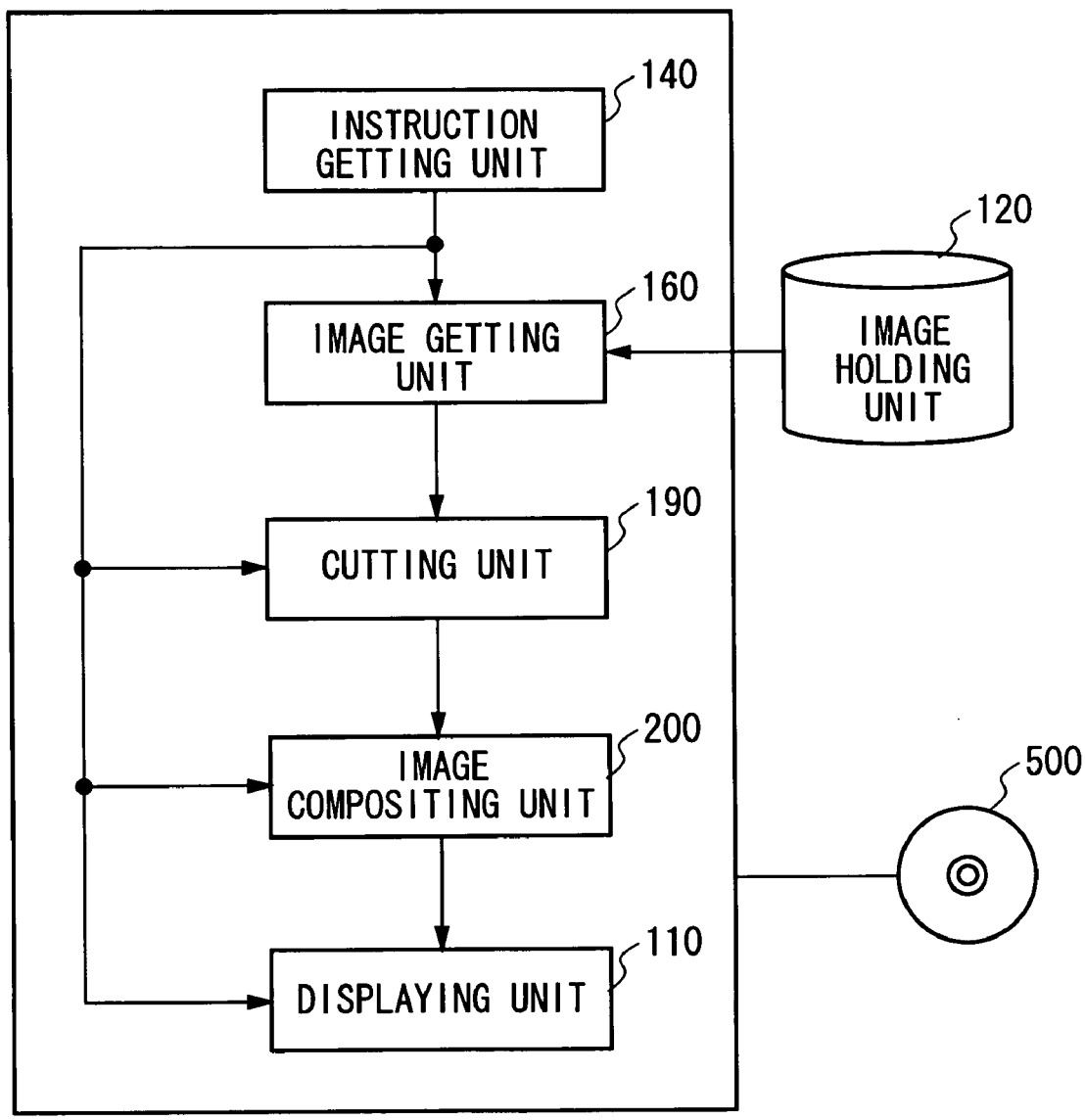
FIG. 9 is a block diagram showing a second embodiment of functional configuration of the displaying apparatus 100.
Figure 10:
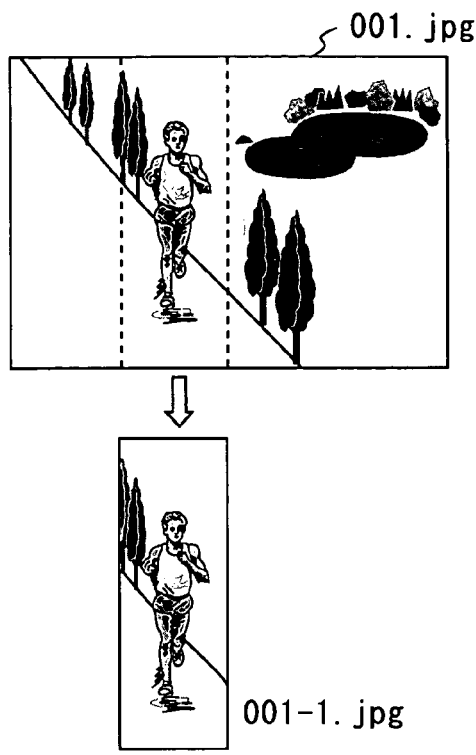
FIG. 10 shows a first example of a cutting unit 190 cutting out a partial image.
Figure 11:
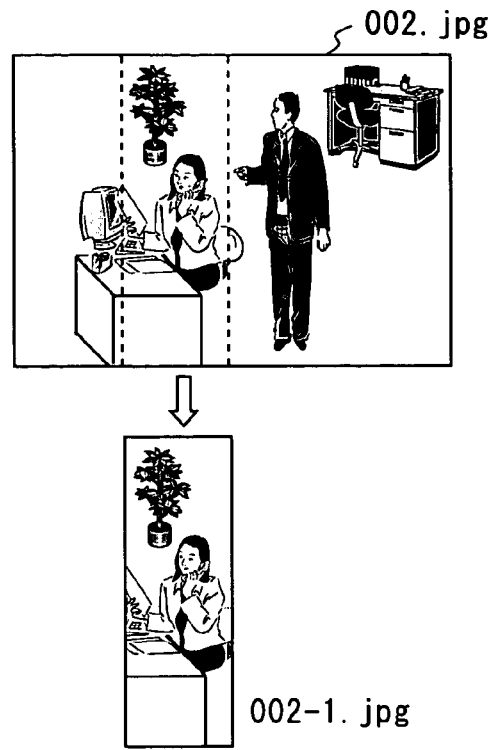
FIG. 11 shows a second example of the cutting unit 190 cutting out a partial image.
Figure 12:
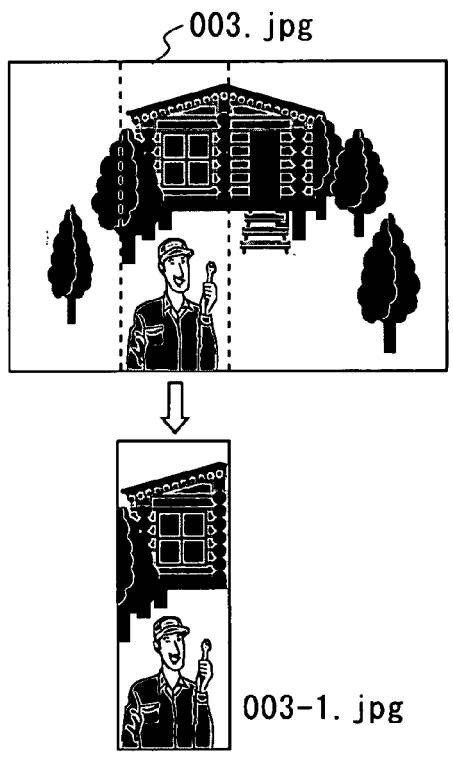
FIG. 12 shows a third example of the cutting unit 190 cutting out a partial image.
Figure 13:
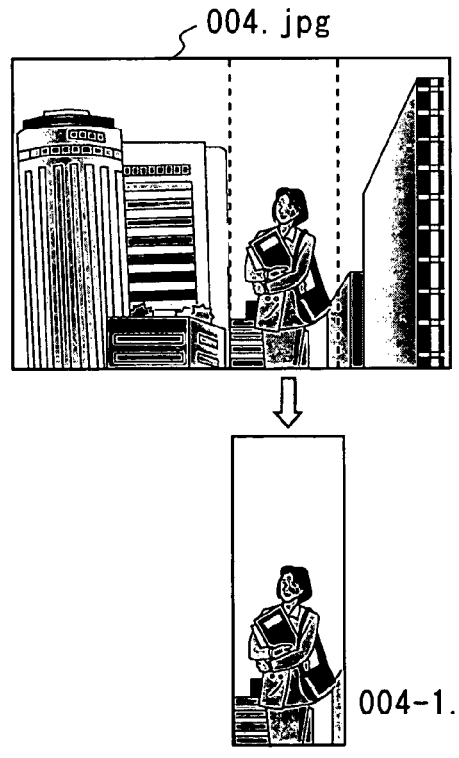
FIG. 13 shows a fourth example of the cutting unit 190 cutting out a partial image.

FIG. 9 shows a second embodiment functional configuration of the displaying apparatus 100. The displaying apparatus 100 of the present embodiment is different from the first embodiment described with respect to FIG. 2 in that it includes a cutting unit 190. An instruction of updating and displaying a plurality of images at high speed is input to the instruction getting unit 140. In case of getting the instruction of updating and displaying a plurality of images at high speed, the image getting unit 160 gets the plurality of images which should be displayed from the image holding unit 120. Further, according to the present embodiment, the image may also be one of a still picture and a moving picture. Then, a plurality of images constituting the moving picture may include one of frame images, field images, and images of various types constituting another moving picture.

The cutting unit 190 cuts out a partial region of each of the plurality of image gotten by the image getting unit 160 as a partial image. For example, each image according to the present embodiment includes information specifying the position of a main object as tag information. Then, the cutting unit 190 retrieves the position of the main object from the tag information of each image and cuts out a partial image from the image so that the main object is the center in the horizontal direction of the partial image and the partial image has a uniform width, for example, one fourth of the width of the original image. In case tag information showing the position of the main object is not written in the image, the cutting unit 190 may perceive an object which is the largest or best focused out of objects included in the image as a main object. Then, a partial image may be cut out with the perceived main object located on the center. In this case, the cutting unit 190 may perceive a person preferentially as a main object. Alternatively, the cutting unit 190 may cut the image by a predetermined width from the center in the horizontal direction as a partial image regardless of the position of the main object.

The image compositing unit 200 generates a composite image by arranging a plurality of partial images of the number which can be displayed at one time out of the plurality of partial images cut out by the cutting unit 190 in the order of displaying images and compositing the plurality of partial images. The generated composite image is displayed on the displaying unit 110, and, if an instruction of updating and displaying a second composite image is input, the image compositing unit 200 generates the second composite image according to the following procedures. The second composite image is generated by deleting a partial image of which displaying order is the first out of the plurality of partial images included in the first composite image and adding a partial image which is not included in the first composite image. The displaying unit 110 updates and displays sequentially the composite images at the update speed designated by the instruction getting unit 140.

The recording medium 500 stores a program for making the displaying apparatus 100 function as the instruction getting unit 140, the image holding unit 120, the image getting unit 160, the cutting unit 190, the image compositing unit 200, and the displaying unit 110 as described above. The recording medium 500 may be connected to the displaying apparatus 100 via a network such as the internet. The displaying apparatus 100 may install this kind of program via the network and execute it.

According to the displaying apparatus 100 of the present embodiment, it is possible to display an object at higher magnification than generating thumb-nail images by reducing a plurality of images and arranging and displaying the thumb-nail images of the number which can be displayed at one time on the displaying unit 110. Therefore, in case of updating and displaying a plurality of images at high speed, the user can perceive feature of each image quickly and certainly.

Each of FIGS. 10, 11, 12, and 13 shows an example of the cutting unit 190 cutting out a partial image. Each of images of the present embodiment includes information specifying the position of a main object as tag information. Then, the cutting unit 190 retrieves the position of a main object from the tag information of each image and cuts out a partial image centering the position of the main object. For example, the cutting unit 190 retrieves the position of a main object from tag information shown in each of 001.jpg, 002.jpg, 003.jpg, and 004.jpg and cuts out one fourth of the width of the image with the main object located on the center of the horizontal direction as a partial image. The partial images cut out constitute a volume of image data shown as 001-1.jpg, 002-1.jpg, 003-1.jpg, and 004-1.jpg.

Figure 14:
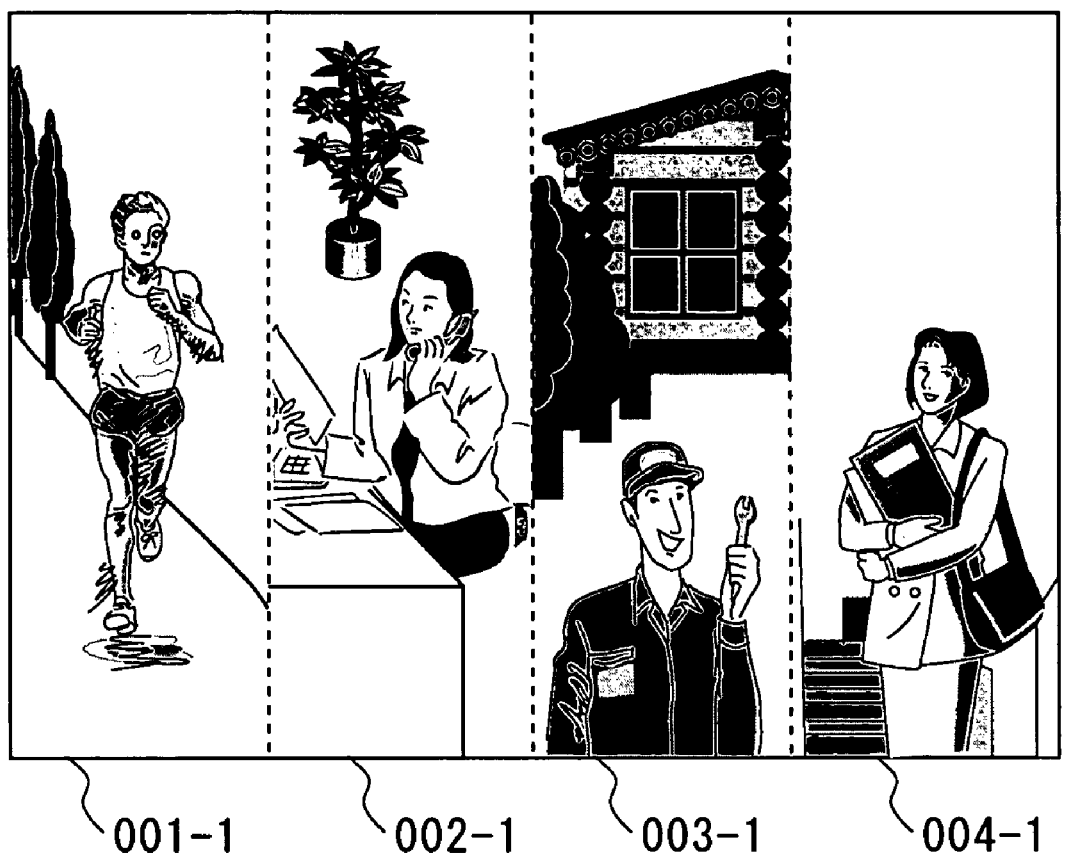
FIG. 14 shows an example of a composite image generated by an image compositing unit 200 from a plurality of partial images.

FIG. 14 shows an example of a composite image generated by the image compositing unit 200 from a plurality of partial images. The image compositing unit 200 generates a composite image by arranging and compositing partial images of the number which can be displayed on the image displaying unit 110 at one time out of the plurality of partial images cut out by the cutting unit 190 in the order of displaying images. For example, the displaying unit 110 according to the present embodiment can arrange and display the maximum four partial images cut by one fourth of the original image in a row. The image compositing unit 200 generates a composite image by compositing four partial images (001-1.jpg, 002-1.jpg, 003-1.jpg, and 004-1.jpg) which can be displayed on the displaying unit 110 according to the order of displaying the original images, for example, from the left to the right.

Figure 15:
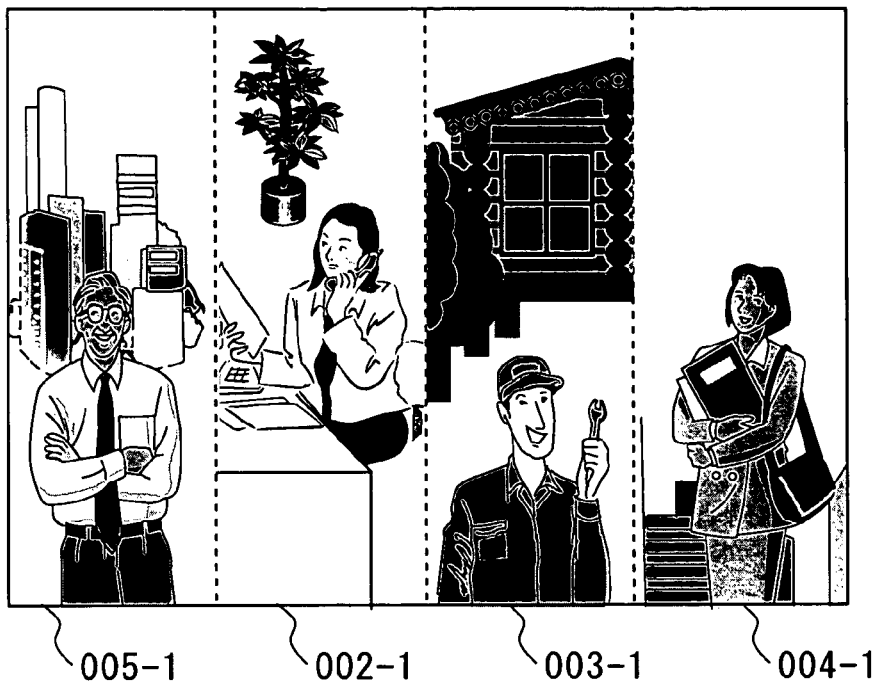
FIG. 15 shows a first example of image compositing unit 200 updating a composite image.
Figure 16:
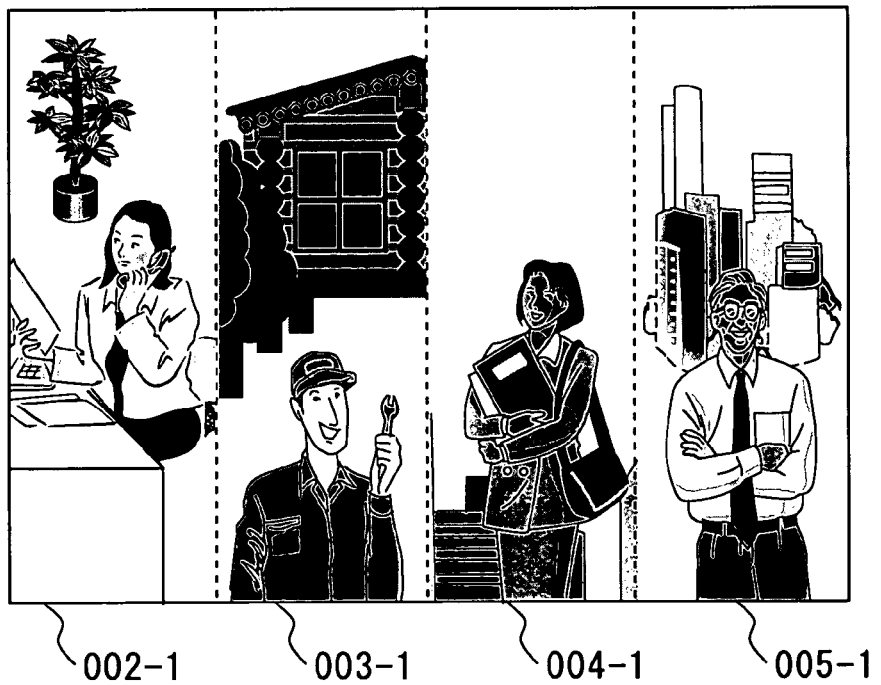
FIG. 16 shows a second example of image compositing unit 200? updating a composite image.

Each of FIGS. 15 and 16 shows an example of the image compositing unit 200 updating a composite image. The image compositing unit 200 generates a second composite image by deleting a partial image of which displaying order is the first out of the plurality of partial images included in the first composite image and adding a partial image which is not included in the first composite image. For example, the image compositing unit 200 deletes 001-1.jpg of which displaying order is the first out of the four partial images included in the composite image shown in FIG. 14. Then, a second composite image is generated by adding 005-1.jpg which is the next partial image which is not included in the first composite image.

In case of generating the second composite image, the image compositing unit 200 may add the next partial image (005-1) to the position of displaying the partial image (001-1) which was deleted just before as shown in FIG. 15. Alternatively, as shown in FIG. 16, the next partial image (005-1) may be added next to the partial image (004-1) which is the last out of partial images included in the first composite image.

Figure 17:
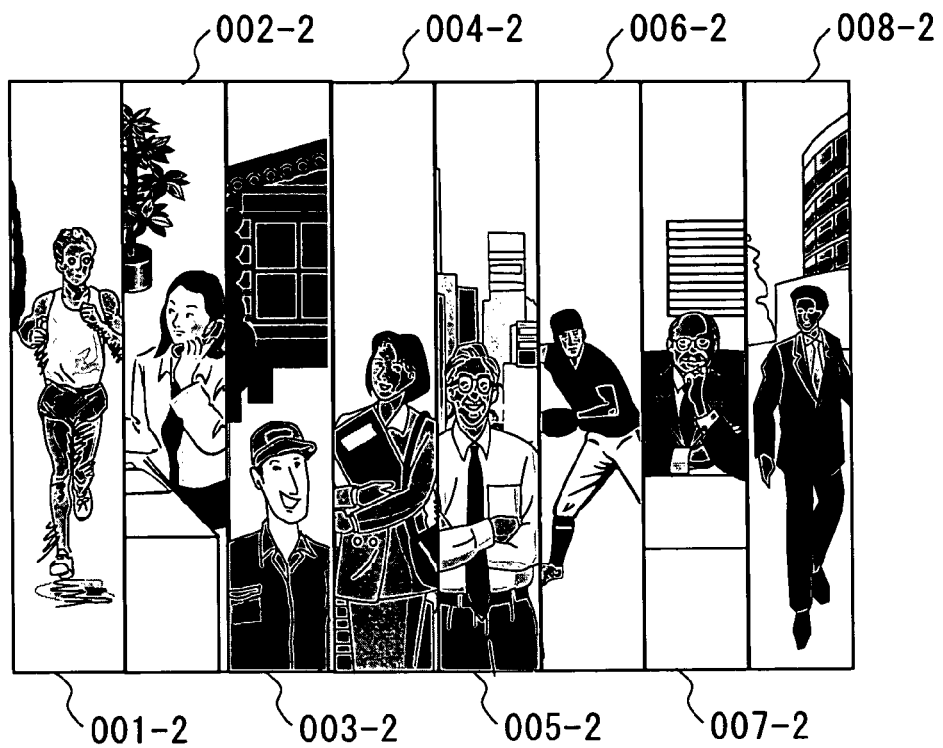
FIG. 17 is an example of a composite image in case the update speed exceeds a threshold value.

FIG. 17 is an example of a composite image in case the update speed exceeds a threshold value. In case the update speed designated by the instruction getting unit 140 exceeds a predetermined threshold value, the cutting unit 190 reduces the size of partial images and the image compositing unit 200 increases the number of partial images included in the composite image. For example, in case the update speed designated by the instruction getting unit 140 by stages is larger than a first threshold value (hereinafter, referred to "threshold value 1"), the cutting unit 190 reduces the width of a partial image cut out from the image to the half of the previous width. In other words, in case the update speed exceeds the threshold value 1, the cutting unit 190 changes the width of a partial image to one eighth of the width of the original image. According to the reduction of the width of the partial image, the number of partial images which can be displayed on the displaying unit 110 at one time is increased. Therefore, the image compositing unit 200 generates a composite image by arranging and compositing more partial images according to the order of displaying original images. By this, the displaying unit 110 can more partial image at one time. Therefore, the user can search for an image at which the user aims from a large number of images more quickly.

Figure 18:
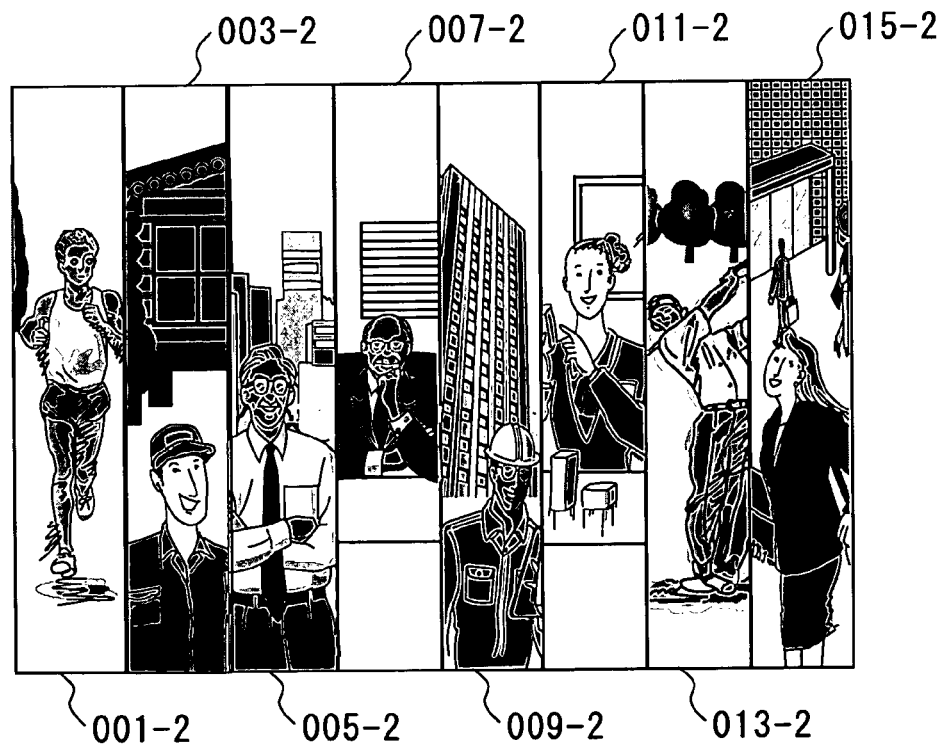
FIG. 18 shows another example of a composite image in case the update speed exceeds a threshold value.

FIG. 18 shows another example of a composite image in case the update speed exceeds a threshold value. In case the update speed designated by the instruction getting unit 140 exceeds a predetermined threshold value, the image compositing unit 200 selects out a plurality of partial images according to a predetermined rule to generate a composite image. For example, in case the update speed exceeds a threshold value 2 which is larger than the threshold value 1 described above, the image compositing unit 200 selects out every second partial image out of partial images cut out by the cutting unit 190 to generate a composite image. In the example of the present figure, 002-2, 004-2, 006-2, and 008-2 played in the example of FIG. 17 are selected out and new partial images, 009-2, 011-2, and 015-2, are added. The rule of selecting out may be arbitrarily set up. Further, as the update speed becomes higher, it is better to select out more images. By selecting out partial images and generating a composite image, it is possible to search for more images at a higher speed.

Figure 19:
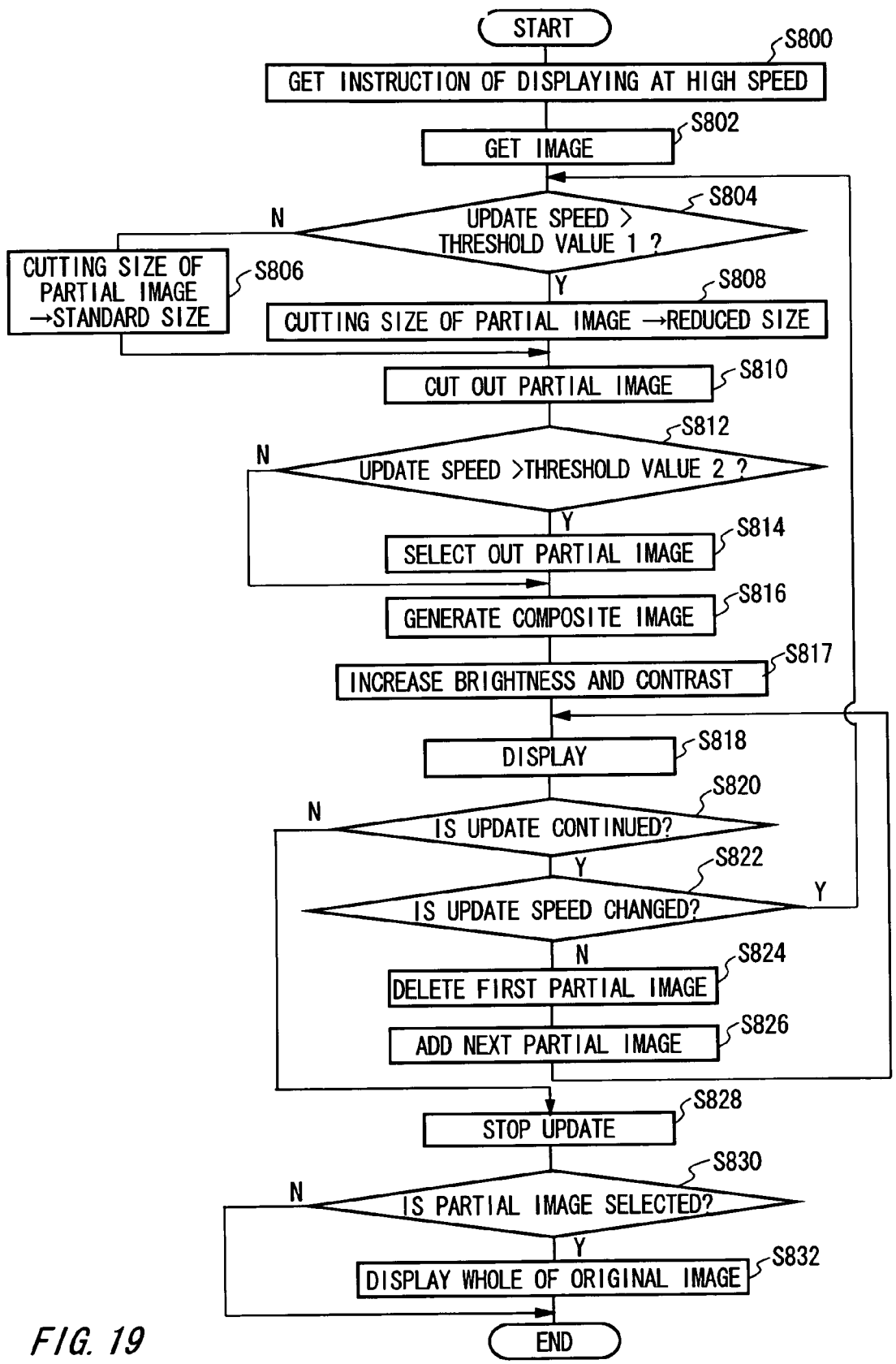
FIG. 19 is a flow chart showing operations of the displaying apparatus 100 shown in FIG. 9.

FIG. 19 is a flow chart showing operations of the displaying apparatus 100 according to the present embodiment. The displaying apparatus 100 operates according to the flowchart in the following and thus updates and displays partial images of many images at high speed. First, the instruction getting unit 140 gets an instruction of updating and displaying a plurality of images at high speed from the user (S800). The image getting unit 160 specifies a plurality of images which should be updated and displayed at high speed on the basis of conditions such as designation of a folder and an image capturing date and time and gets the images from the image holding unit 120 (S802).

The cutting unit 190 judges whether or not the update speed input to the instruction getting unit 140 exceeds the threshold value 1 (S804). In case the input update speed does not exceed the threshold value 1 (S804: No), the cutting unit 190 sets the size of the partial image cut out to a standard size, for example, one fourth of the width of the original display image (S806). In the meantime, in case the input update speed exceeds the threshold value 1 (S804: No), the cutting unit 190 sets the size of the partial image cut out to a size, for example, one fourth of the width of the original display image (S808). The cutting unit 190 retrieves the tag information of each image. Then, in case the position of a main object is written in the tag information, a partial image is cut out so as to have the width set up in S806 or S808 with the center in the horizontal direction located on the position of the main object (S810). In case the position of the main object is not written in the tag information, the cutting unit 190 cuts the center of the image by the width set above.

Then, the image compositing unit 200 judges whether or not the update speed input to the instruction getting unit 140 exceeds the threshold value 2 (S812). In case the input update speed exceeds the threshold value 2 (S812: Yes), the image compositing unit 200 selects out the partial image cut out by the cutting unit 190 (S814). In the meantime, in case the input update speed does not exceed the threshold value 2 (S812: No), the process in S814 is skipped.

Then, the image compositing unit 200 generates a composite image by arranging and compositing partial images of the number which can be displayed at one time on the displaying unit 110 out of the plurality of partial images according to the order of displaying images (S816). The displaying unit 110 raises at least one of brightness and contrast of display in case of updating and displaying images at high speed (S817) and displays the composite image (S818). By raising at least one of brightness and contrast of display, visibility is improved in case of updating and displaying images at high speed.

Then, the image compositing unit 200 judges whether or not an instruction of continuing to update and display images is input from the instruction getting unit 140 (S820). In case the instruction of continuing to update and display images is input (S820: Yes), it is also judged whether or not the update speed is varied (S822). In case it is judged that the update speed is varied, the procedure returns to S804. In the meantime, in case update speed is not varied, the image compositing unit 200 generates a second composite image by deleting a partial image of which displaying order is the first out of a plurality of partial images included in a first composite image which has been displayed till now (S824) and adding the next partial image which is not included in the composite image (S826). Then, the procedure returns to S818, the composite image is updated and the second composite image is displayed.

In the meantime, in S820, in case the instruction of continuing to update and display images is not input in S820 (S820: No), the displaying unit 110 stops updating images (S828). If one partial image is selected from a plurality of partial images displayed on the displaying unit 110 at the time image update is stopped (S830: Yes), the displaying unit 110 gets the original image of the selected partial image and displays the whole of the image (S832). Thus, the present flow is finished.

As clear from the above explanation, according to the present embodiment, it is possible to provide a displaying apparatus which displays a large number of images quickly in a short time while guaranteeing high visibility. Therefore, the user can quickly find out an image which he or she wants out of the large number of images.

Figure 20:
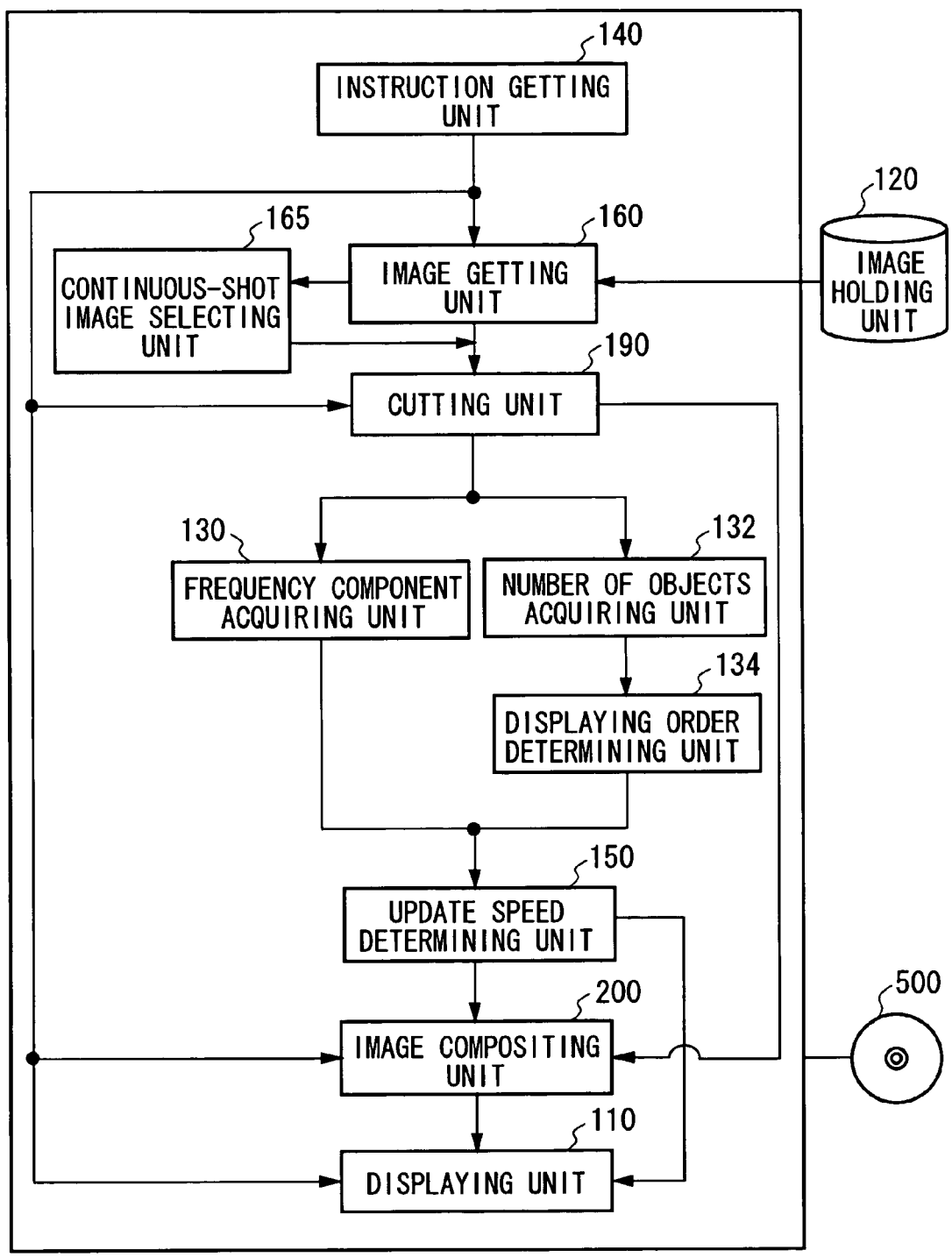
FIG. 20 is a block diagram showing a third embodiment of functional configuration of the displaying apparatus 100.

FIG. 20 shows a third embodiment functional configuration of the displaying apparatus 100. The displaying apparatus 100 includes an image holding unit 120, an instruction getting unit 140, an image getting unit 160, a continuous-shot image selecting unit 165, a cutting unit 190, a frequency component acquiring unit 130, a number of objects acquiring unit 132, a displaying order determining unit 134, update speed determining unit 150, an image compositing unit 200, and a displaying unit 110. Here, since each of the image holding unit 120, the instruction getting unit 140, the image getting unit 160, the cutting unit 190, the image compositing unit 200, and the displaying unit 110 has a function which is substantially the same as that of the element indicated by the same reference numeral in FIGS. 1 to 19, detailed explanation on them is omitted. Further, the displaying apparatus 100 according to the present embodiment may be an example of the displaying apparatus described above with respect to FIGS. 1 to 19. Then, the displaying apparatus 100 according to the present embodiment may further include a part or the whole of the configuration and the functions of the displaying apparatus 100 described above with respect to FIGS. 1 to 19.

An instruction of updating and displaying a plurality of images at high speed is input to the instruction getting unit 140. The instruction getting unit 140 provides the image getting unit 160, the cutting unit 190, the image compositing unit 200, and a displaying unit 110 with information based on the input instruction. In case of getting the instruction of updating and displaying a plurality of images at high speed from the instruction getting unit 140, the image getting unit 160 gets the plurality of images which should be displayed from the image holding unit 120. The image getting unit 160 provides the cutting unit 190 and the continuous-shot image selecting unit 165 with the images gotten from the image holding unit 120. Further, the image may be a still picture or a moving picture. Further, a plurality of images constituting the moving picture may be frame images, field images, and images of various types constituting different moving pictures.

The continuous-shot image selecting unit 165 selects a plurality of images captured by continuous-shot out of the plurality of image gotten by the image getting unit 160. The continuous-shot image selecting unit 165 may judge whether or not a plurality of images gotten from the image getting unit 160 have been captured by continuous-shot on the basis of image capturing time of each of the plurality of images when the image has been captured. For example, the continuous-shot image selecting unit 165 analyzes information on image capturing time included each of the captured plurality of images. Then, in case the image taking time of each of a plurality of images is included in a predetermined interval, the continuous-shot image selecting unit 165 judges that the plurality of images are captured by continuous-shot.

Further, the continuous-shot image selecting unit 165 may judge whether or not a plurality of images have been captured by continuous-shot on the basis of an image capturing apparatus ID for uniquely identifying an image capturing apparatus and image capturing time of each of the plurality of images. For example, it is assumed that a plurality of images have been captured at a predetermined time interval by different image capturing apparatus and the captured plurality of images are held in the image holding unit 120. In a related case, it cannot be properly and certainly judged whether or not a plurality of images have been captured by continuous-shot by only information showing image capturing time included in each of the plurality of images. In other words, even in case image taking time of each of a plurality of images is close to that of other, sometimes the plurality of images have not been by the same image capturing apparatus. However, the continuous-shot image selecting unit 165 can judge whether or not a plurality of images have been captured by continuous-shot on the basis of an ID of an image capturing apparatus which has captured each of the plurality of images and image capturing time when each of the plurality of images has been captured. By this, even in case the image holding unit 120 includes images captured by different image capturing apparatus, the continuous-shot image selecting unit 165 can properly and certainly judge whether or not a plurality of images have been captured by continuous-shot and select a plurality of image captured by continuous-shot.

Further, the continuous-shot image selecting unit 165 may whether or not a plurality of images have been captured by continuous-shot on the basis of similarity between images acquired from the plurality of images. In other words, the continuous-shot image selecting unit 165 acquires similarity of each of a plurality of images by an image processing such as image matching for each of the plurality of images. Then, the continuous-shot image selecting unit 165 may judge that a plurality of images having similarity larger than a predetermined reference value have been captured by continuous-shot. The continuous-shot image selecting unit 165 provides the cutting unit 190 with the selected plurality of images.

The cutting unit 190 cuts a partial region of each of the plurality of images received from the image getting unit 160 and the continuous-shot image selecting unit 165 as a partial image. Further, the cutting unit 190 may give an identifier for uniquely identifying each of the partial images cut out to the partial image. In case one image gotten by the image getting unit 160 includes information specifying the positions of a plurality of main objects, the cutting unit 190 cut out a plurality of partial images from the one mage so that one partial image includes one main object. For example, the cutting unit 190 retrieves the positions of a plurality of main objects from tag information of each image. Then, the cutting unit 190 cuts out a partial image centering on each of the plurality of main objects in the vertical or horizontal direction with a predetermined width. By this, in case one image includes a plurality of main objects, the cutting unit 190 can partial images each of which includes each of the plurality of main objects.

Further, the cutting unit 190 retrieves information which specifies the direction of each of the plurality of images gotten from the image getting unit 160 and is included in the image, that is, image direction specifying information. The image direction specifying information may be information such as a landscape mode or a portrait mode, for example. In case of retrieving information of a landscape mode as the image direction specifying information included in each of the plurality of images gotten from the image getting unit 160, the cutting unit 190 cuts out a laterally long partial image from the image directed laterally. In the meantime, in case of retrieving information of a portrait mode as the image direction specifying information included in each of the plurality of images gotten from the image getting unit 160, the cutting unit 190 cuts out a longitudinally long partial image from the image directed longitudinally. The cutting unit 190 provides the frequency component acquiring unit 130, the number of objects acquiring unit 132, and the image compositing unit 200 with the cut out partial image. Further, the cutting unit 190 provides the image compositing unit 200 with a plurality of partial images cut out by the cutting unit 190 from the plurality of images selected by the continuous-shot image selecting unit 65.

The frequency component acquiring unit 130 receives the plurality of images cut by the cutting unit 190 and acquires frequency components included in each of the plurality of images. The frequency component acquiring unit 130 provides the update speed determining unit 150 with information on the frequency components acquired for each image. The number of objects acquiring unit 132 acquires the number of objects included in each of the plurality of partial images cut out by the cutting unit 190. Further, the number of objects acquiring unit 132 may acquire the number of persons included in each of the plurality of partial images cut out by the cutting unit 190. The number of objects acquiring unit 132 extracts persons by image processing such as template matching, skin color extracting, etc. and acquires the number of persons included in each of the plurality of partial images. The number of objects acquiring unit 132 provides the displaying order determining unit 134 with the acquired number of objects.

The displaying order determining unit 134 determines a displaying order of each image according to the number of persons acquired by the number of objects acquiring unit 132. The displaying order determining unit 134 provides the update speed determining unit 150 with the displaying order of the images.

The update speed determining unit 150 determines update speed of each of the plurality of partial image according to the contents of the plurality of partial images cut out by the cutting unit 190. The update speed determining unit 150 determines the update speed of a partial image to be lower as the level of frequency component of the partial image which is acquired by and received from the frequency component acquiring unit 130 and which is higher than a predetermined frequency is higher. Further, the update speed determining unit 150 may determine the update speed of a partial image to be lower as the number of objects of the partial image which is acquired by the number of objects acquiring unit 132 is larger. In addition, the update speed determining unit 150 may determine the update speed of a partial image to be lower as the number of persons of the partial image which is acquired by the number of objects acquiring unit 132 is larger. By this, since the update speed of a partial image of which contents cannot be easily and quickly perceived by the eyes may be determined to be low, the user can easily grasp the contents of the image. In the meantime, since the update speed of a partial image of which contents can be easily and quickly perceived by the eyes may be determined to be high, the user can quickly find out a partial image at which the user aims. The update speed determining unit 150 provides the image compositing unit 200 with the determined update speed of the partial image and the displaying order of the partial image determined by the displaying order determining unit 134.

The image compositing unit 200 generates a composite image by arranging and compositing partial images of the number which can be displayed at one time out of the plurality of partial images cut out by the cutting unit 190. Then, the image compositing unit 200 generates a second composite image by deleting one of the plurality of partial images included in the generated composite image and adding the next partial image which is not included in the composite image. Further, in case the cutting unit 190 cuts out a plurality of partial images so that each of the partial image includes each of a plurality of main objects from one image, the image compositing unit 200 may generate a composite image by arranging and compositing the plurality of partial images cut out by the cutting unit 190 from the one image.

Further, in case of receiving the plurality of partial images cut out from the plurality of images selected by the continuous-shot image selecting unit from the cutting unit 190, the image compositing unit 200 may generate a plurality of composite images so that each of the plurality of partial images cut out is displayed in the same position of each of the plurality of composite images in time-series and continuously. The image compositing unit 200 may generates a second composite image by generating a first composite image including a partial image cut out from a first image selected by the continuous-shot image selecting unit 165, deletes the partial image cut out from the first image selected by the continuous-shot image selecting unit 165, and adds a partial image included in a second image selected by the continuous-shot image selecting unit 165.

Further, the image compositing unit 200 may generate a second composite image by determining a partial image to be deleted from the first composite image on the basis of the update speed of each partial image determined by the update speed determining unit 150 and adding the next partial image. For example, the image compositing unit 200 leaves a partial image of which update speed is determined to be slow by the update speed determining unit 150 in the composite image, deletes another image other than the partial image from the composite image, and adds the next partial image.

Further, the image compositing unit 200 may select partial images one by one according to the displaying order determined by the displaying order determining unit 134 and generate a plurality of composite images one by one. Then, in case a laterally long partial image is cut out from an image directed laterally by the cutting unit 190, the image compositing unit 200 may generates a composite image by arranging and compositing a plurality of laterally long partial images. Further, in case a longitudinally long partial image is cut out from an image directed longitudinally by the cutting unit 190, the image compositing unit 200 may generates a composite image by arranging and compositing a plurality of longitudinally long partial images. The image compositing unit 200 provides the displaying unit 110 with the composite images.

The displaying unit 110 updates the composite images received from the image compositing unit 200 at the update speed designated by the instruction getting unit 140 and displays them one by one. Further, the displaying unit 110 updates and displays the partial images cut out from the plurality of images which have been selected by the continuous-shot image selecting unit 165 at update speed higher than that of partial images cut out from a plurality of images which have not been selected by the continuous-shot image selecting unit 165.

Further, the displaying unit 110 updates and displays each of partial images at update speed determined by the update speed determining unit 150 for the partial image. The displaying unit 110 updates and displays each of partial images at update speed determined on the basis of frequency components, the number of objects, and the number of persons of the partial image by the update speed determining unit 150. In other words, the displaying unit 110 can update and display a partial image which the eyes cannot perceive in which case such a large number of objects or persons are included, in a lower update speed. By this, a person can perceive the partial image certainly.

The recording medium 500 stores a program for making the displaying apparatus 100 function as the image holding unit 120, the instruction getting unit 140, the image getting unit 160, the continuous-shot image selecting unit 165, the cutting unit 190, the frequency component acquiring unit 130, the number of objects acquiring unit 132, the displaying order determining unit 134, the update speed determining unit 150, the image compositing unit 200, and the displaying unit 110 as described above. The recording medium 500 may be connected to the displaying apparatus 100 via a network such as the internet. The displaying apparatus 100 may install this kind of program via the network and execute it.

According to the displaying apparatus 100 of the present embodiment, in case one image includes a plurality of main objects, it is possible to cut out each of plurality of main objects and generate a composite image from the plurality of partial images cut out. By this, even in case a plurality of objects are included in one image, each of the plurality of objects can be perceived more certainly and thus the user can select an image which he or she wants to enjoy more accurately.

Further, according to the displaying apparatus 100 of the present embodiment, it is possible to generate a plurality of composite images from partial images of a plurality of images captured by continuous-shot and update and display the plurality of composite images at update speed higher than that of the partial images of the images captured by continuous-shot. By this, it is possible to reduce a period during which similar captured images occupy a part of the displaying unit 110. Further, the displaying unit 110 updates and displays a plurality of images captured by continuous-shot at a higher speed and thus the images may seem a moving picture to a person's eyes. Thus, it is possible to reduce load imposed on image processing in comparison with displaying a moving picture itself.

In addition, according to the displaying apparatus 100 of the present embodiment, it is possible to determine update speed of a plurality of partial images according to contents of the plurality of partial images. By this, since it is possible to make a partial image which the user cannot easily perceive by his or her eyes, that is, of which contents cannot be easily grasped by perception of the eyes, displayed longer, the user can grasp the contents of the partial image more certainly. In other words, for even an image of which contents cannot be easily grasped, the user can judge whether the image is what he or she wants to enjoy more certainly.

Further, according to the displaying apparatus 100 of the present embodiment, it is possible to generate a composite image on the basis of the direction of a captured image. By this, since it is possible to generate a composite image proper to the direction of a partial image, the user can select a captured image which he or she wants to enjoy more accurately without feeling a sense of incompatibility.

Figure 21:
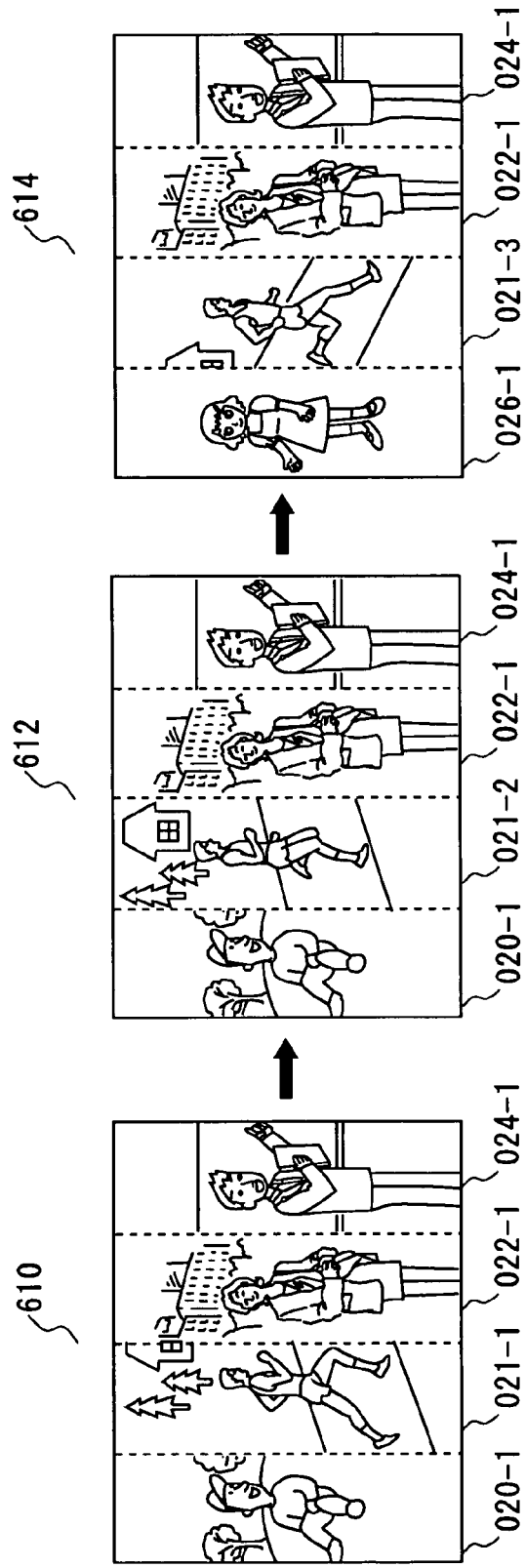
FIG. 21 shows an example of a composite image generated from a plurality of partial images by the image compositing unit 200.

FIG. 21 shows an example of a composite image generated from a plurality of partial images by the image compositing unit 200. The image compositing unit 200 generates a composite image by arranging and compositing partial images of the number which can be displayed at one time on the displaying unit 110 out of a plurality of partial images cut out by the cutting unit 190. Then, the displaying unit 110 updates and displays partial images cut out from a plurality of images which have been selected by the continuous-shot image selecting unit 165 at update speed higher than that of partial images cut out from a plurality of images which have not been selected by the continuous-shot image selecting unit 165.

For example, the displaying unit 110 of the present embodiment is assumed to be able to display maximumly four (4) partial images, each of which is generated by cutting out one fourth of the width of the original image, in the horizontal direction. The image compositing unit 200 generates a composite image 610 by compositing four (4) partial images 020-1, 021-1, 022-1, and 024-1 which can be displayed on the displaying unit 110. Then, the displaying unit 110 updates and displays a part on which the partial image 021-1 selected by the continuous-shot image selecting unit 165 is displayed at update speed higher than other partial images.

In other words, partial images 021-1, 021-1, and 021-3 cut out from images selected by the continuous-shot image selecting unit 165 form a part of composite images 610, 612, and 614 according to the order of image capturing time, respectively. In the meantime, update speed partial images 020-1, 022-1, and 024-1 cut out from images which have not been selected by the continuous-shot image selecting unit 165 is set to be lower than that of the images selected by the continuous-shot image selecting unit 165. For example, the partial image 021-1 cut out from the image selected by the continuous-shot image selecting unit 165 is updated to the partial images 021-2 and 021-3 and thus the composite images 612 and 614 are generated. In a related case, a partial image cut out from an image which has not been selected by the continuous-shot image selecting unit 165 is not updated while the composite image 610 is updated to the composite image 612.t Then, update speed of an image which has not been selected by the continuous-shot image selecting unit 165 may be set to be lower than that of an image which has been selected by the continuous-shot image selecting unit 165 so that the partial image 020-1 is updated to the partial image 026-1 when the composite image 614 is generated from the composite image 612.

According to the displaying apparatus 100 of the present embodiment, it is possible to generate a composite image by updating partial images of images captured by continuous-shot at update speed higher than that of partial images of images which have not been captured by continuous-shot. By this, the displaying apparatus 100 can prevent similar partial images out of images captured by continuous-shot from continuing to occupy the same position of the displaying unit 110 and make a person feel that a moving picture is projected on his or her eyes.

Figure 22:
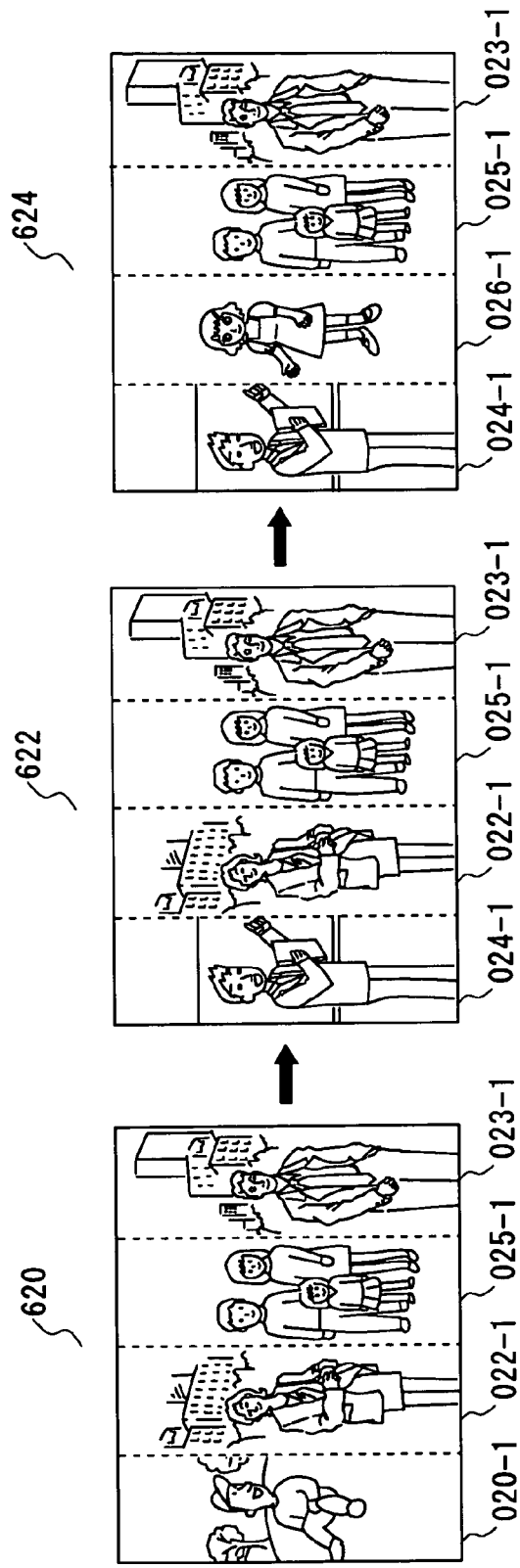
FIG. 22 shows an example of a composite image generated from a plurality of partial images by the image compositing unit 200.

FIG. 22 shows an example of a composite image generated from a plurality of partial images by the image compositing unit 200. The image compositing unit 200 generates a composite image by arranging and compositing partial images of the number which can be displayed on the displaying unit 110 at one time out of a plurality of partial images cut out by the cutting unit 190. Then, the update speed determining unit 150 determines update speed of a partial image according to the contents of the partial image. Then, the displaying unit 110 updates a partial image on the basis of the update speed determined by the update speed determining unit 150 for the partial image and displays a composite image.

For example, a composite image 620 includes a partial image 025-1 including a plurality of persons. In case a plurality of persons are included in the partial image 025-1, the update speed of the partial image 025-1 is set to be lower than that of partial images 020-1, 022-1, and 023-1, each of which includes only one object, in order to make the user easily grasp the contents of the partial image 025-1. In other words, in case composite images 622 and 624 are generated in time-series, the partial image 025-1 is not updated during a predetermined period and the partial images 020-1, 022-1, and 023-1 except 025-1 are updated at update speed higher than that of the partial image 025-1. For example, in case the composite image 620 is updated to the composite image 622, the partial image 020-1 is updated to the partial image 024-1. Further, in case the composite image 622 is updated to the composite image 624, the partial image 022-1 is updated to the partial image 026-1. In other words, in case the partial images except for 025-1 are not images which the user cannot quickly perceive, composite images may be generated by updating the partial images according to the order of displaying the partial images. In addition, an image which the user cannot quickly perceive may be, for example, an image including a plurality of objects, an image including a plurality of persons, and an image from which space frequency components are acquired, the level of high frequency components higher than a predetermined frequency being high.

According to the displaying apparatus 100 of the present embodiment, in case a partial image which a person cannot quickly perceive, for example, an image including a plurality of objects, an image including a plurality of persons, and an image of which level of high frequency components higher than a predetermined frequency is higher, is included, it is possible to lower update speed of the partial image. By this, a person can grasp the contents of a captured image more certainly.

Figure 23:
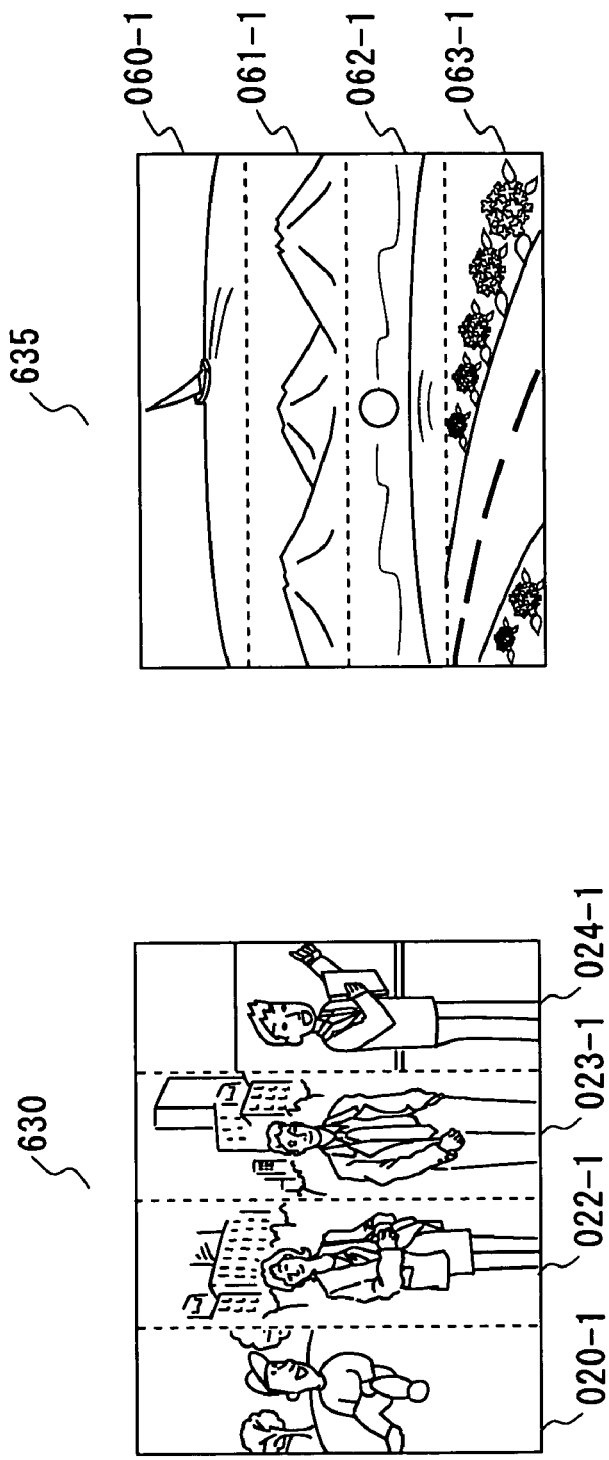
FIG. 23 shows an example of a composite image generated from a plurality of partial images by the image compositing unit 200.

FIG. 23 shows an example of a composite image generated from a plurality of partial images by the image compositing unit 200. The image compositing unit 200 generates a composite image by arranging and compositing partial images cut out by the cutting unit 190 on the basis of information which is included in each of a plurality of images gotten by the image getting unit 160 and specifies the direction of the image.

For example, in case each of the plurality of images gotten by the image getting unit 160 includes information showing a portrait mode, the cutting unit 190 cut out longitudinally long partial images 020-1, 022-1, 023-1, and 024-1 from the image of portrait mode, that is, directed longitudinally. Then, the image compositing unit 200 generates a composite image 630 from the longitudinally long partial images 020-1, 022-1, 023-1, and 024-1.

Further, in case each of the plurality of images gotten by the image getting unit 160 includes information showing a landscape mode, the cutting unit 190 cut out laterally long partial images 060-1, 061-1, 062-1, and 063-1 from the image of landscape mode, that is, directed laterally. Then, the image compositing unit 200 generates a composite image 635 from the laterally long partial images 060-1, 061-1, 062-1, and 063-1.

According to the displaying apparatus 100 of the present embodiment, it is possible to cut out partial images in a proper direction from a captured image according to the direction of the image and generate a composite image. By this, the user can check out partial images for the composite image giving no sense of incompatibility visibly.

Figure 24:
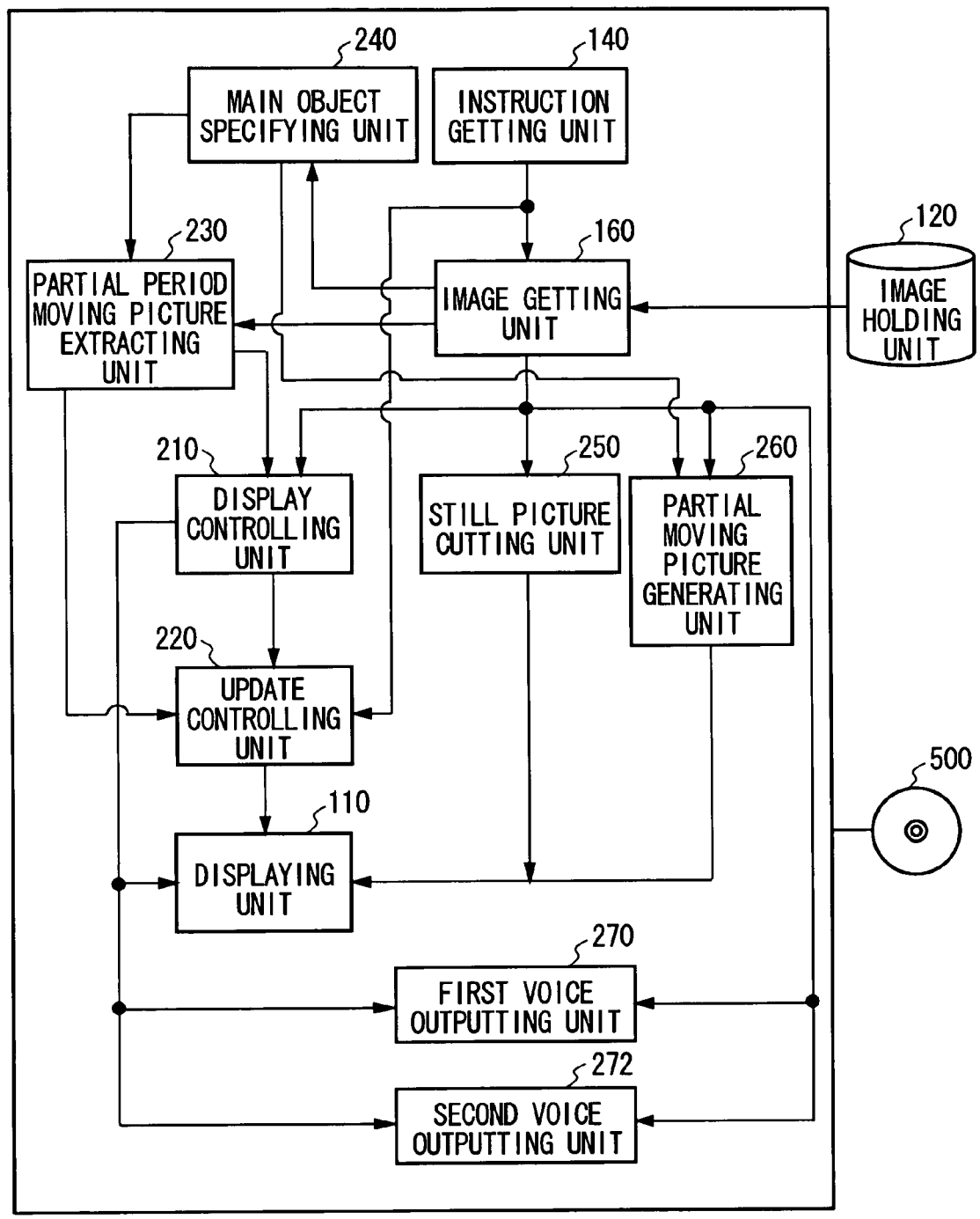
FIG. 24 is a block diagram showing a fourth embodiment of functional configuration of the displaying apparatus 100.

FIG. 24 shows a fourth embodiment of functional configuration of the displaying apparatus 100. The displaying apparatus 100 includes an image holding unit 120, an instruction getting unit 140, an image getting unit 160, a main object specifying unit 240, a partial period moving picture extracting unit 230, a display controlling unit 210, a still picture cutting unit 250, a partial moving picture generating unit 260, an update controlling unit 220, a displaying unit 110, a first voice outputting unit 270, and a second voice outputting unit 272. Here, since each of the instruction getting unit 140, the image getting unit 160, and the displaying unit 110 has a function which is substantially the same as that of the element indicated by the same reference numeral in FIGS. 1 to 23, detailed explanation on them is omitted. Further, the displaying apparatus 100 according to the present embodiment may be an example of the displaying apparatus 100 described above with respect to FIGS. 1 to 23. Further, the displaying apparatus 100 according to the present embodiment may further include a part or the whole of the configuration and the functions of the displaying apparatus 100 described above with respect to FIGS. 1 to 23.

The instruction getting unit 140 gets an instruction of updating and displaying a plurality of images including a still picture and a moving picture at high speed, for example, update speed designated by the user. The instruction getting unit 140 provides the image getting unit 160 and the update controlling unit 220 with information on the instruction of updating and displaying a plurality of images at high speed designated by the user. In case of receiving information on the instruction of updating and displaying a plurality of images at high speed from the instruction getting unit 140, the image getting unit 160 gets a still picture and a moving picture which should be displayed from the image holding unit 120. The image getting unit 160 provides the main object specifying unit 240, the display controlling unit 210, the partial period moving picture extracting unit 230, a still picture cutting unit 250, and a partial moving picture generating unit 260 with the image gotten from the image holding unit 120. Further, in case the gotten image includes voice, the image getting unit 160 provides the first and second voice outputting units 270 and 272 with voice data.

The main object specifying unit 240 specifies a main object of a moving picture gotten by the image getting unit 160. In case an object is a person, the main object specifying unit 240 may set the person preferentially to a main object of the moving picture. The main object specifying unit 240 gives information specifying the position of an object which is specified as the main object to an image including the main object as tag information. The main object specifying unit 240 provides the partial period moving picture extracting unit 230 and the partial moving picture generating unit 260 with the moving picture to which the tag information is given. The partial period moving picture extracting unit 230 extracts a partial period moving picture which is a moving picture of a characteristic partial period out of the moving picture gotten by the image getting unit 160. In addition, the partial period moving picture may be a moving picture composed of a plurality of images captured during a predetermined interval before and after the time at which the image including the main object has been captured. Further, a plurality of images constituting the moving picture may include one of frame images, field images, and images of various types constituting different moving pictures.

The partial period moving picture extracting unit 230 extracts a partial period moving picture from the moving picture to which the tag information is given by the main object specifying unit 240. In other words, the partial period moving picture extracting unit 230 extracts a partial period moving picture including a part in which an image of the main object specified by the main object specifying unit 240 is captured. In addition, the partial period moving picture extracting unit 230 may give an identifier for uniquely identifying the extracted partial period moving picture to the extracted partial period moving picture. Further, the partial period moving picture extracting unit 230 may extract a plurality of images in which the main object is larger in comparison with the background as the partial period moving picture. Specifically, the partial period moving picture extracting unit 230 acquires the area of the main object and, in case the area of the main object is larger than a predetermined value, extracts a partial period moving picture centering around an image including the main object. In addition, the partial period moving picture extracting unit 230 may acquire a part of the moving pictures which shows the main object for a long time continuously as a partial period moving picture.

Further, the partial period moving picture extracting unit 230 may extract a part of the moving picture accompanied with voice of which volume is larger than a predetermined reference value as a partial period moving picture. For example, the partial period moving picture extracting unit 230 may extract a part in which volume of a person's voice is larger than a predetermined reference value as a partial period moving picture. In addition, the partial period moving picture extracting unit 230 may generate a partial period moving picture so as to reproduce the moving picture while making a loop from the start and the end of the extracted partial period moving picture. The partial period moving picture extracting unit 230 provides the display controlling unit 210 with the extracted partial period moving picture. Further, the partial period moving picture extracting unit 230 provides the update controlling unit 220 with the partial period moving picture identifier corresponding to the extracted partial period moving picture.

The display controlling unit 210 makes a still picture or a moving picture which has not been displayed yet out of the still pictures or the moving pictures gotten by the image getting unit 160 displayed on the displaying unit 110, instead of one of still pictures and moving pictures displayed on the displaying unit 110. Specifically, the display controlling unit 210 makes an image gotten by the image getting unit 160 correspond to an image identifier for uniquely identifying the image. In addition, the partial period moving picture extracting unit 230 gives a partial period moving picture identifier for uniquely identifying a partial period moving picture to the partial period moving picture.

Then, the display controlling unit 210 adds information showing that the image and the partial period moving picture are displayed on the display unit 110 to the image and the partial period moving picture. Then, the display controlling unit 210 retrieves information on an image and a partial period moving picture provided to the displaying unit 110, that is, the image identifier, the partial period moving picture identifier, and the information showing that the displaying unit 110 displays an image and a partial period moving picture, from the displaying unit 110 and judges whether or not the image and the partial period moving picture held by the display controlling unit 210 are displayed on the displaying unit 110. Then, the display controlling unit 210 provides the displaying unit 110 with an image and a partial period moving picture which have not been displayed yet on the displaying unit 110.

Further, in case an image and a partial period moving picture are accompanied with voice, the displaying unit 210 provides the first and the second voice outputting units 270 and 272 with information on the position on the displaying unit 110 on which an image accompanied with voice data and voice is displayed. Further, the display controlling unit 210 provides the update controlling unit 220 with image identifiers of images which is displayed and should be displayed next on the displaying unit 110 and partial period moving picture identifiers of partial period moving pictures which is displayed and should be displayed next on the displaying unit 110.

The still picture cutting unit 250 cuts out a partial region from the still picture gotten from the image getting unit 160. The partial region cut out by the still picture cutting unit 250 may be a region including a main object and, in case an object is a person, preferentially a region including the person. The still picture cutting unit 250 provides the displaying unit 110 with the cut out still picture.

The partial moving picture generating unit 260 generates a partial moving picture by cutting out a partial region of each of a plurality of images constituting the moving picture gotten by the image getting unit 160. The region cut out by the partial moving picture generating unit 260 may be a region including a main object. In addition, the images constituting the moving picture may include one of frame images, field images, and images of various types constituting different moving pictures. Further, the partial moving picture generating unit 260 cuts out a partial region of each of the plurality of images constituting the moving picture gotten by the image getting unit 160 so that the partial region includes the main object specified by the main object specifying unit 240.

Further, the partial moving picture generating unit 260 may generate a partial moving picture tracking the main object specified by the main object specifying unit 240. Specifically, the partial moving picture generating unit 260 tracks a main object by using an image to which information on the position of the main object is added as tag information by the main object specifying unit 240 to generate a partial image. More specifically, the partial moving picture generating unit 260 retrieves the tag information given to the image and cuts out a partial region of the image constituting the moving picture which includes the main object. Then, the partial moving picture generating unit 260 generates a partial moving picture from the region cut out from the image constituting the moving picture which includes the main object. The partial moving picture generating unit 260 provides the displaying unit 110 with the generated partial moving picture.

The displaying unit 110 arranges and displays each of still picture and moving pictures of the number which can be displayed at one time. The displaying unit 110 may arrange and display the still picture(s) gotten by the image getting unit 160 and the partial period moving picture(s) extracted by the partial period moving picture extracting unit 230. Further, the displaying unit 110 may arrange and display each of the partial still picture(s) cut out by the still picture cutting unit 250 and the partial moving picture(s) generated by the partial moving picture generating unit 260.

The update controlling unit 220 updates and displays still picture(s) or moving picture(s) to be displayed on the displaying unit 110 one by one on the basis of the update speed designated by the user, that is, information on the update speed received from the instruction getting unit 140. Further, the update controlling unit 220 updates images which are being displayed on the displaying unit 110 on the basis of the image identifiers of images which is displayed and should be displayed next on the displaying unit 110 and the partial period moving picture identifiers of partial period moving pictures which is displayed and should be displayed next on the displaying unit 110 and displays images after the update.

Further, the update controlling unit 220 may update and display still pictures displayed on the displaying unit 110 one by one at the update speed designated by the user while the partial period moving picture extracted by the partial period moving picture extracting unit 230 is being displayed. In other words, the update controlling unit 220 may update still pictures of other parts except for a part of the displaying unit 110, which is displaying the partial period moving picture, one by one. Then, after display of the partial period moving picture is finished, the update controlling unit 220 displays one of the next still picture, moving picture, and partial period moving picture on the place where the partial period moving picture has been displayed.

Further, the update controlling unit 220 may update and display still pictures displayed on the displaying unit 110 one by one at the update speed designated by the user while the moving picture gotten by the image getting unit 160 is being displayed. In other words, the update controlling unit 220 may update still pictures of other parts except for a part of the displaying unit 110, which is displaying the moving picture, one by one. Then, after display of the moving picture is finished, the update controlling unit 220 displays one of the next still picture, moving picture, and partial period moving picture on the place where the moving picture has been displayed.

In case the displaying unit displays a plurality of moving pictures simultaneously, the first and the second voice outputting units 270 and 272 output each of a plurality of voices accompanied with the plurality of moving pictures in a direction corresponding to the position where each of the plurality of moving pictures is displayed. For example, the first and the second voice outputting units 270 and 272 are disposed symmetrically with respect to the displaying unit 110. Further, voice of a moving picture is output from the first voice outputting unit 270 or the second outputting unit 272 according to the position of displaying the moving picture on the displaying unit 110.

For example, in case a moving picture is being played on a position nearer to the first voice outputting unit 270, voice of the moving picture is output by the first voice outputting unit 270. Further, the first and the second voice outputting units 270 and 272 may be stereophonic systems and make the direction of reproducing voice specified by controlling phase difference between the right and left channels of stereophonic reproduction. In other words, by making a localized position of voice of a moving picture identical to the position of displaying the moving picture, it is possible to make the user feel the voice from the direction of displaying the moving picture.

The recording medium 500 stores a program for making the displaying apparatus 100 function as the image holding unit 120, the instruction getting unit 140, the image getting unit 160, the main object specifying unit 240, the partial period moving picture extracting unit 230, the display controlling unit 210, the still picture cutting unit 250, the partial moving picture generating unit 260, the update controlling unit 220, the displaying unit 110, the first voice outputting unit 270, and the second voice outputting unit 272. The recording medium 500 may be connected to the displaying apparatus 100 via a network such as the internet. The displaying apparatus 100 may install this kind of program via the network and execute it.

According to the displaying apparatus 100 of the present embodiment, it is possible to extract a partial period moving picture which is a part of a moving picture during a characteristic period, and arrange and display the partial period moving picture with still picture(s) gotten by the image getting unit 160. By this, a part of a moving picture which the user wants to enjoy can be properly and certainly displayed and the user can check out a large number of still pictures and moving pictures while updating the still pictures and the moving pictures one by one.

Further, according to the displaying apparatus 100 of the present embodiment, it is possible to generate and display partial images tracking a main object included in a moving picture. By this, since the displaying unit 110 displays the partial images with the main object as the central figure, it is possible to prevent the user from missing a still picture and a moving picture including the main object while searching for a moving picture what the user wants even in case the displaying unit 110 updates and displays still pictures and moving pictures at high speed.

Further, according to the displaying apparatus 100 of the present embodiment, it is possible to make the user feel that voice accompanying each of a plurality of moving pictures sounds from the direction of displaying the moving picture. By this, the user can quickly judge which moving picture the voice corresponds to.

Figure 25:
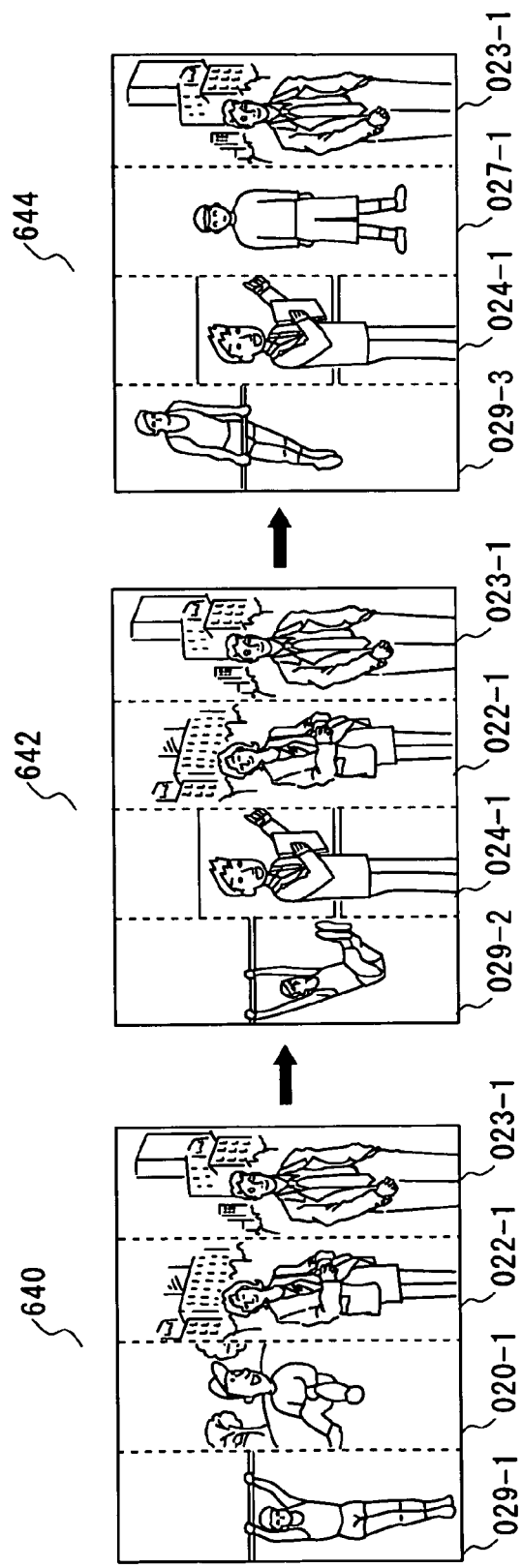
FIG. 25 shows an example of images arranged and displayed on the displaying unit 110.

FIG. 25 shows an example of a case in which still pictures and a moving picture are arranged and displayed. For an image 640, a partial image 029-1 shows a partial region cut out from a plurality of images constituting a moving picture. Further, each of partial images 020-1, 022-1, and 023-1 shows a partial region cut out from a still picture. According to the displaying apparatus 100 of the present embodiment, the displaying unit 110 displays a partial period moving picture which is a part of a moving picture during a characteristic period and the partial period moving picture is shown as 029-1, 029-2, and 029-3 included in images 640, 642, and 644, respectively. Further, partial images 020-1, 022-1, and 023-1 each of which is a part of a still picture are arranged with the partial period moving picture and displayed.

Further, on the displaying unit 110, images each of which is a partial region of a still picture are updated one by one while the partial period moving picture is shown as a moving picture such as the partial images 029-1, 029-2, and 029-3. For example, in case the image 640 is updated to the image 642, the partial image 020-1 is updated to the partial image 024-1. Then, in case the image 642 is updated to the image 644, the partial image 022-1 is updated to the partial image 027-1.

According to the displaying apparatus 100 of the present embodiment, it is possible to arrange and display still picture(s) while extracting and displaying a partial period moving picture which is a characteristic part of a moving picture and update and display the still picture(s) and the partial period moving picture one by one. By this, even in case a large number of still pictures and moving pictures are stored in the displaying apparatus 100, the user can find out a still picture and a moving picture which the user wants to enjoy quickly.

Although the present invention has been described by way of exemplary embodiments, it should be understood that those skilled in the art might make many changes and substitutions without departing from the spirit and the scope of the present invention which is defined only by the appended claims.

What is claimed is:

1. A displaying apparatus for sequentially updating and displaying a plurality of images comprising:
   an image getting unit for getting a plurality of images which should be displayed in case of getting an instruction of updating and displaying the plurality of images at high speed;
   a cutting unit for cutting out a partial region of each of the plurality of image gotten by said image getting unit as a partial image;
   an image compositing unit for generating a first composite image by arranging a plurality of partial images of the number which can be displayed at one time out of the plurality of partial images cut out by said cutting unit and compositing the plurality of partial images and generating a second composite image by deleting one partial image of the plurality of partial images included in the first composite image and adding a second partial image which is not included in the first composite image;
   a displaying unit for sequentially updating the composite image at a designated update speed selected by the displaying apparatus to display the composite image; and
   wherein in case the designated update speed of images displayed is faster than a predetermined threshold value, said cutting unit reduces the size of the partial image and said image compositing unit increases the number of partial images included in the composite image.

2. A displaying apparatus for sequentially updating and displaying a plurality of images comprising:
   an image getting unit for getting a plurality of images which should be displayed in case of getting an instruction of updating and displaying the plurality of images at high speed;
   a cutting unit for cutting out a partial region of each of the plurality of image gotten by said image getting unit as a partial image;
   an image compositing unit for generating a first composite image by arranging a plurality of partial images of the number which can be displayed at one time out of the plurality of partial images cut out by said cutting unit and compositing the plurality of partial images and generating a second composite image by deleting one partial image of the plurality of partial images included in the first composite image and adding a second partial image which is not included in the first composite image;
   a displaying unit for sequentially updating the composite image at a designated update speed selected by the displaying apparatus to display the composite image, and
   further comprising a continuous-shot image selecting unit for selecting a plurality of images captured by continuous-shot of the plurality of images gotten by said image getting unit, wherein said image compositing unit generates a plurality of composite images so that at least one of a plurality of partial images each of which is cut out from each of the plurality of images selected by said continuous-shot image selecting unit are displayed at positions of the plurality of composite images continuously and in time-series.

3. A displaying apparatus as claimed in any one of claims 1 or 2, wherein in case one image obtained by said image getting unit includes information specifying the position of a plurality of main objects, said cutting unit cuts the image into a plurality of partial images so that the plurality of partial images includes the plurality of main objects, respectively, and said image compositing unit generates a composite image by arranging the plurality of partial images cut out from the one image by said cutting unit and compositing the plurality of partial images.

4. A displaying apparatus as claimed in any one of claims 1 or 2, wherein said displaying unit increases at least one of brightness and contrast of display in case of updating and displaying images at high speed.

5. A displaying apparatus as claimed in any one of claims 1 or 2, further comprising an update speed determining unit for determining update speed at which the partial images are updated according to the contents of the plurality of partial images cut out by said cutting unit, wherein said image compositing unit determines a partial image to be deleted from the first composite image based on the update speed of each partial image determined by said update speed determining unit and generates a second composite image by adding a second partial image, and said displaying unit updates and displays each of the partial images at the update speed of the partial image determined by said update speed determining unit.

6. A displaying apparatus as claimed in claim 5 further comprising a frequency component acquiring unit for acquiring frequency components included in each of the plurality of images cut by said cutting unit, wherein said update speed determining unit determines update speed of a partial image displayed to be slower as the level of frequency component of the partial image, acquired by said frequency component acquiring unit, which is higher than a predetermined frequency, is higher.

7. A displaying apparatus as claimed in claim 5 further comprising a number of objects acquiring unit for acquiring the number of objects included in each of the plurality of partial images cut out by said cutting unit, wherein said update speed determining unit determines update speed of a partial image displayed to be slower as the number of objects acquired by said number of objects acquiring unit is larger.

8. A displaying apparatus as claimed in claim 7, wherein said number of objects acquiring unit acquires the number of persons included in each of the plurality of partial images cut out by said cutting unit, and said update speed determining unit determines update speed of a partial image displayed to be slower as the number of persons acquired by said number of objects acquiring unit is larger.

9. A displaying apparatus as claimed in any one of claims 1 or 2, further comprising a number of objects acquiring unit for acquiring the number of persons included in each of the plurality of partial images cut out by said cutting unit, and a displaying order determining unit for determining the displaying order according to the number of objects acquired by said number of objects acquiring unit, wherein said image compositing unit generates a plurality of composite images sequentially by selecting partial images sequentially according to the displaying order determined by said displaying order determining unit.

10. A displaying apparatus as claimed in any one of claims 1 or 2, wherein each of the plurality of images gotten by said image getting unit includes information specifying the direction of the image, said cutting unit cuts out a laterally long partial image from an image directed laterally and a longitudinally long partial image from an image directed longitudinally, and said image compositing unit generates a composite image by collecting and compositing the laterally long partial images and a composite image by collecting and compositing the longitudinally long partial images.

11. A displaying apparatus as claimed in any one of claims 1 or 2, wherein each of the plurality of images gotten by said image getting unit includes information specifying the position of a main object, and said cutting unit cuts out a partial image so that the partial image includes the main object.

12. A displaying apparatus as claimed in claim 2, wherein said image compositing unit generates a first composite image including a partial image cut out from a first image selected by said continuous-shot image selecting unit and generates a second composite image by deleting a partial image included in the first image selected by said continuous-shot image selecting unit adding a partial image included in a second image selected by said continuous-shot image selecting unit, and said displaying unit updates and displays the partial images cut out from the plurality of images selected by said continuous-shot image selecting unit at display speed lower than that of partial images cut out from a plurality of images which are not selected by said continuous-shot image selecting unit.

13. A displaying method for sequentially updating and displaying a plurality of images by a displaying apparatus comprising steps of:
  getting a plurality of images which should be displayed in case of getting an instruction of updating and displaying the plurality of images at high speed;
  cutting out a partial region of each of the gotten plurality of image as a partial image;
  generating a composite image by arranging a plurality of partial images of the number which can be displayed at one time and compositing the plurality of partial images,
  generating a first composite image by arranging a plurality of partial images of the number which can be displayed at one time out of the plurality of partial images cut out by said cutting unit and compositing the plurality of partial images and generating a second composite image by deleting one partial image of the plurality of partial images included in the first composite image and adding a second partial image which is not included in the first composite image;
  sequentially updating the composite image at a designated update speed selected by the displaying apparatus to display the composite image; and
  wherein in case the designated update speed of images displayed is faster than a predetermined threshold value, said cutting unit reduces the size of the partial image and said image compositing unit increases the number of partial images included in the composite image.

14. A machine readable medium storing thereon a computer program for a displaying apparatus for sequentially updating and displaying a plurality of images, the program making the displaying apparatus perform an image getting function of getting a plurality of images which should be displayed in case of getting an instruction of updating a plurality of images at high speed;
  a cutting function of cutting out a part of each of the plurality of image gotten by an image getting unit as a partial image;
  an image compositing function of generating a first composite image by arranging a plurality of partial images of the number which can be displayed at one time out of the plurality of partial images cut out by a cutting unit and compositing the plurality of partial images and generating a second composite image by deleting one partial image of the plurality of partial images included in the first composite image and adding a second partial image which is not included in the first composite image;
  a displaying function of sequentially updating the composite image at a designated update speed selected by the displaying apparatus to display the composite image; and wherein in case the designated update speed of images displayed is faster than a predetermined threshold value, said cutting unit reduces the size of the partial image and said image compositing unit increases the number of partial images included in the composite image.

15. A displaying apparatus for sequentially updating and displaying a plurality of images comprising:
   an image getting unit for getting a still pictures and moving pictures which should be displayed in case of getting an instruction of updating and displaying the still pictures and the moving pictures at high speed;
   a displaying unit for arranging and displaying each of still pictures and moving pictures of a number which can be displayed at one time out of the still pictures and the moving pictures gotten by said image getting unit;
   a display controlling unit for making a still picture or a moving picture which has not been displayed on said displaying unit out of the still picture and the moving picture gotten by said image getting unit displayed on said displaying unit instead of one of the still picture and the moving pictures which are being displayed on said displaying unit;
   an update controlling unit for updating and displaying sequentially the still picture and the moving picture displayed by said displaying unit at an update speed designated by a user to an instruction getting unit;
   a partial period moving picture extracting unit for extracting a partial period moving picture which is a part of the moving picture during a characteristic partial period, wherein said displaying unit arranges and displays the still picture gotten by said image getting unit and the partial period moving picture extracted by said partial period moving picture extracting unit, and said update controlling unit sequentially updates and displays the still picture displayed by said displaying unit at the update speed designated by the user while the partial period moving picture extracted by said partial period moving picture extracting unit is displayed, and
   wherein said partial period moving picture extracting unit extracts a partial period moving picture including a part where volume of voice accompanying the moving picture is larger than a predetermine value out of the moving picture gotten by said image getting unit.

16. A displaying apparatus as claimed in claim 15 further comprising a main object specifying unit for specifying a main object of the moving picture gotten by said image getting unit, Wherein said partial period moving picture extracting unit extracts a partial period moving picture including a part where an image of the main object specified by said main object specifying unit is captured.

17. A displaying apparatus as claimed in claim 15, wherein said update controlling unit updates and displays the still picture displayed by said displaying unit sequentially at the update speed designated by the user.

18. A displaying apparatus as claimed in claim 15 further comprising a still picture cutting unit for cutting out a partial region of the still picture gotten by said image getting unit as a partial still picture, and a partial moving picture generating unit for generating a partial moving picture by cutting out a partial region of each of a plurality of images constituting the moving picture gotten by said image getting unit, wherein said displaying unit arranges and displays each of the still picture cut out by said still picture cutting unit and the partial moving picture generated by said partial moving picture generating unit.

19. A displaying apparatus as claimed in claim 18 further comprising a main object specifying unit for specifying a main object of the moving picture gotten by said image getting unit, wherein said partial moving picture generating unit cuts out a partial region of each of the plurality of images constituting the moving picture gotten by said image getting unit so that the partial region includes the main object specified by said main object specifying unit and generates a partial moving picture tracking the main object specified by said main object specifying unit.

20. A displaying apparatus as claimed in claim 15 further comprising a plurality of voice outputting units which, in case said displaying unit displays a plurality of moving pictures at the same time, outputting voice accompanying each of the plurality of moving pictures from the direction corresponding the position where the moving picture is displayed.

21. A displaying method for sequentially updating and displaying a plurality of images comprising steps of:
   getting a still picture and a moving picture which should be displayed in case of getting an instruction of updating and displaying the still picture and the moving picture at high speed;
   arranging and displaying each of still pictures and moving pictures of a number which can be displayed at one time out of the still picture and the moving picture gotten;
   making a still picture or a moving picture which has not been displayed out of the still picture and the gotten moving picture displayed instead of one of the still picture and the moving pictures which are being displayed;
   updating and displaying sequentially the still picture and the moving picture displayed at an update speed designated by a user to an instruction getting unit; and
   a partial period moving picture extracting unit extracting a partial period moving picture which is a part of the moving picture during a characteristic partial period, wherein said displaying unit arranges and displays the still picture gotten by said image getting unit and the partial period moving picture extracted by said partial period moving picture extracting unit, and said update controlling unit sequentially updates and displays the still picture displayed by said displaying unit at the update speed designated by the user while the partial period moving picture extracted by said partial period moving picture extracting unit is displayed; and
   wherein said partial period moving picture extracting unit extracts a partial period moving picture including a part where volume of voice accompanying the moving picture is larger than a predetermine value out of the moving picture gotten by said image getting unit.

22. A machine readable medium storing thereon a computer program for a displaying apparatus for sequentially updating and displaying a plurality of images, the program making the displaying apparatus perform;
   an image getting function of getting a still picture and a moving picture which should be displayed in case of getting an instruction of updating and displaying the still picture and the moving picture at high speed;
   a displaying function of arranging and displaying each of still pictures and moving pictures of a number which can be displayed at one time out of the still picture and the moving picture gotten by an image getting unit;
   a display controlling function of making a still picture or a moving picture which has not been displayed on a displaying unit out of the still picture and the moving picture gotten by the image getting unit displayed on the displaying unit instead of one of the still picture and the moving pictures which are being displayed on the displaying unit;

an update controlling function of updating and displaying sequentially the still picture and the moving picture displayed by the displaying unit at an update speed designated by a user to an instruction getting unit; and a partial period moving picture extracting unit extracting a partial period moving picture which is a part of the moving picture during a characteristic partial period, wherein said displaying unit arranges and displays the still picture gotten by said image getting unit and the partial period moving picture extracted by said partial period moving picture extracting unit, and said update controlling unit sequentially updates and displays the still picture displayed by said displaying unit at the update speed designated by the user while the partial period moving picture extracted by said partial period moving picture extracting unit is displayed; and wherein said partial period moving picture extracting unit extracts a partial period moving picture including a part where volume of voice accompanying the moving picture is larger than a predetermine value out of the moving picture gotten by said image getting unit.

* * * * *